United States Patent
Naskar et al.

(10) Patent No.: US 11,739,218 B2
(45) Date of Patent: Aug. 29, 2023

(54) LIGNIN-BASED POLYMERS WITH ENHANCED MELT EXTRUSION ABILITY

(71) Applicant: UT-Battelle, LLC, Oak Ridge, TN (US)

(72) Inventors: Amit K. Naskar, Knoxville, TN (US); Ngoc A. Nguyen, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 134 days.

(21) Appl. No.: 17/487,061

(22) Filed: Sep. 28, 2021

(65) Prior Publication Data

US 2022/0010137 A1 Jan. 13, 2022

Related U.S. Application Data

(63) Continuation of application No. 16/257,313, filed on Jan. 25, 2019, now Pat. No. 11,161,983.
(Continued)

(51) Int. Cl.
*C08L 97/00* (2006.01)
*C08L 9/02* (2006.01)
(Continued)

(52) U.S. Cl.
CPC .......... *C08L 97/005* (2013.01); *B29C 64/106* (2017.08); *B29C 64/118* (2017.08);
(Continued)

(58) Field of Classification Search
CPC ................................ C08L 97/005; C08L 9/02
See application file for complete search history.

(56) References Cited

U.S. PATENT DOCUMENTS

| 3,098,053 A | 7/1963 | Hallonquist |
| 4,988,469 A | 1/1991 | Reavely et al. |

(Continued)

FOREIGN PATENT DOCUMENTS

| CN | 103059776 A | 4/2013 |
| WO | 2004056699 A2 | 7/2004 |

OTHER PUBLICATIONS

Akato, K., et al., "Poly(ethylene oxide)-Assisted Macromolecular Self-Assembly of Lignin in ABS Matrix for Sustainable Composite Applications", ACS Sustainable Chem. Eng. 2015, Revised Oct. 25, 2015, Published Nov. 5, 2015, pp. 3070-3076, 3.
(Continued)

*Primary Examiner* — Vu A Nguyen
(74) *Attorney, Agent, or Firm* — Scully, Scott, Murphy & Presser, P.C.

(57) ABSTRACT

A solid polymer blend material comprising: (i) a lignin-acrylonitrile component containing a homogeneous blend of a lignin component and an acrylonitrile-containing rubber component; and (ii) a styrene-containing thermoplastic component that is non-elastomeric; wherein components (i) and (ii) are homogeneously dispersed in the polymer blend material. Methods for producing the blend material are also described. Methods for producing objects made of the blend material by melt extrusion are also described, comprising: (a) melt blending components (i) and (ii) to form a polymer blend in which components (i) and (ii) are homogeneously blended, wherein the polymer blend exhibits a melt viscosity of no more than 2000 Pa·s at a shear rate of 100-1000 s$^{-1}$ and when heated to a temperature of no more than 240° C.; and (b) forming an object made of said polymer blend material.

20 Claims, 11 Drawing Sheets

Related U.S. Application Data

(60) Provisional application No. 62/656,415, filed on Apr. 12, 2018, provisional application No. 62/621,705, filed on Jan. 25, 2018.

(51) Int. Cl.

| | | |
|---|---|---|
| *C08L 25/04* | (2006.01) | |
| *B29C 64/106* | (2017.01) | |
| *B29C 64/118* | (2017.01) | |
| *B33Y 70/10* | (2020.01) | |
| *B33Y 10/00* | (2015.01) | |
| *C08L 55/02* | (2006.01) | |
| *C08L 25/14* | (2006.01) | |
| *C08L 25/06* | (2006.01) | |
| *C08H 7/00* | (2011.01) | |

(52) U.S. Cl.
CPC ............... *B33Y 70/10* (2020.01); *C08H 6/00* (2013.01); *C08L 9/02* (2013.01); *C08L 25/06* (2013.01); *C08L 25/14* (2013.01); *C08L 55/02* (2013.01); *B33Y 10/00* (2014.12)

(56) References Cited

U.S. PATENT DOCUMENTS

| | | |
|---|---|---|
| 6,853,260 B1 | 2/2005 | Hajimiri et al. |
| 9,296,876 B2 | 3/2016 | Jeol et al. |
| 9,815,985 B2 | 11/2017 | Naskar et al. |
| 2015/0368471 A1* | 12/2015 | Naskar .................... C08K 3/38 524/72 |
| 2016/0347000 A1 | 12/2016 | Kerrigan |
| 2017/0015828 A1* | 1/2017 | Naskar .................... C08L 9/06 |
| 2018/0371253 A1 | 12/2018 | Naskar et al. |

OTHER PUBLICATIONS

Benini, K.C.C.C. et al., "Mechanical properties of HIPS/sugarcane bagasse fiber composites after accelerated weathering", Proceedia Engineering, (2011), pp. 3246-3251, vol. 10.

Dickson, A.N. et al., "Fabrication of continuous carbon, glass and Kevlar fibre reinforced polymer composites using additive manufacturing", Additive Manufacturing, (2017), pp. 146-152, vol. 16.

International Search Report and Written Opinion dated Mar. 22, 2019 issued in PCT/US19/15088, 12 pages.

Mao, N.D., et al., "Enhanced mechanical and thermal properties of recycled ABS/nitrile rubber/nanofil N15 nanocomposites", Composites Part B: Engineering, May 15, 2016, pp. 280-288, vol. 93.

Niessner, et al., Styrene Copolymers: Rising Demand for Specialty Polymers, www.kunsstoffe-international.com, Oct. 2014, 6 pages.

Song, et al., "Effect of Lignin Incorporation and Reactive Compatibilization on the Morphological, Rheological, and Mechanical Properties of ABS Resin", Journal of Macromolecular Science, Part B: Physics, pp. 720-735, 51 :4.

* cited by examiner (1E)

(1F)

(5A)

(5B)

LIGNIN-BASED POLYMERS WITH ENHANCED MELT EXTRUSION ABILITY

CROSS-REFERENCE TO RELATED APPLICATIONS

The present application is a continuation of U.S. application Ser. No. 16/257,313 filed Jan. 25, 2019, which claims benefit of U.S. Provisional Application No. 62/621,705 filed Jan. 25, 2018 and U.S. Provisional Application No. 62/656,415 filed Apr. 12, 2018, all of the contents of which are incorporated herein by reference.

STATEMENT REGARDING FEDERALLY SPONSORED RESEARCH

This invention was made with government support under Prime Contract No. DE-AC05-00OR22725 awarded by the U.S. Department of Energy. The government has certain rights in the invention.

FIELD OF THE INVENTION

The present invention relates generally to lignin compositions, and more particularly, to lignin compositions with melt extrusion ability.

BACKGROUND OF THE INVENTION

The fast growth of polymer 3D-printing technologies warrants the development of printable matter from sustainable feedstocks. The use of plant-based renewable resources in polymer products helps reduce human dependency on petroleum and lowers the carbon footprint associated with manufacturing. Lignin, a natural polymer, is a coproduct from paper mills and biorefineries and has, for decades, been considered a promising feedstock for renewable plastics.

However, lignin-based thermoplastics generally do not exhibit acceptable properties for melt extrusion and production (e.g., injection molding or additive manufacturing) of objects. Generally, lignin and its blends and copolymers possess an unacceptably high level of viscosity and a lack of melt stability in its molten state, and brittleness at room temperature. Moreover, particularly in the case of additive manufacturing via fused deposition modeling, while a good shear-thinning behavior permits good printability of a solid polymer, its room temperature stiffness should be capable of withstanding the normally high feeding rate of the filament without buckling. An increased temperature of the printing nozzle is typically not found to be viable since lignin will often become crosslinked, degrade, and char at elevated temperatures. Thus, there would be a significant benefit in a lignin-based material having an acceptably low melt viscosity and resistance to buckling during extrusion to more easily produce a host of objects in which lignin is incorporated.

SUMMARY OF THE INVENTION

The present disclosure is directed to lignin-containing solid polymer blend materials that advantageously possess reduced melt viscosities, reduced brittleness, and a substantial resistance to buckling of the solid filament strand during extrusion via fused deposition modeling. Thus, the blend materials described herein advantageously expand the use of lignin as a building material in methods in which melt extrusion is used. The present invention achieves this by forming a blend of the lignin with an acrylonitrile-containing rubber component (e.g., nitrile rubber) and a styrene-containing thermoplastic component that is non-elastomeric. More specifically, the polymer blend material contains the following components: (i) a lignin-acrylonitrile component containing a homogeneous blend of a lignin component and an acrylonitrile-containing rubber component; and (ii) a styrene-containing thermoplastic component that is non-elastomeric; wherein the components (i) and (ii), i.e., the lignin, acrylonitrile-containing rubber, and styrene-containing thermoplastic components, are homogeneously dispersed in the solid polymer blend material.

In another aspect, the present disclosure is directed to methods for producing the polymer blend material and for producing objects therefrom. The method for producing objects from the polymer blend material generally involves the following steps: (a) melt blending the following components: (i) a lignin-acrylonitrile component containing a homogeneous blend of a lignin component and an acrylonitrile-containing rubber component; and (ii) a styrene-containing thermoplastic component that is non-elastomeric, to form a polymer blend in which components (i) and (ii) are homogeneously blended, wherein the polymer blend exhibits a melt viscosity of no more than 2000 Pa·s at a shear rate of 100-1000 $s^{-1}$ when heated to a temperature of no more than 240° C.; and (b) forming an object made of the polymer blend material (e.g., by depositing layers of extruded melt). In more specific embodiments, which may be particularly suited to an additive manufacturing (AM) method, the method for producing an object from the polymer blend material involves the following steps: (a) producing a solid polymer blend material comprising: (i) a lignin-acrylonitrile component containing a homogeneous blend of a lignin component and an acrylonitrile-containing rubber component; and (ii) a styrene-containing thermoplastic component that is non-elastomeric, wherein components (i) and (ii) are homogeneously dispersed in the solid polymer blend material; (b) melting the solid polymer blend material to produce a melt of the solid polymer blend material, wherein the melt exhibits a melt viscosity of no more than 2000 Pa·s at a shear rate of 100-1000 $s^{-1}$ when heated to a temperature of no more than 240° C.; and (c) forming an object made of the polymer blend material (e.g., by depositing the melt layer by layer). By virtue of the special method used in producing these blend materials, the blend materials may contain high loadings of lignin, such as at least 50 wt % or higher.

BRIEF DESCRIPTION OF THE FIGURES

FIG. 1A shows stress-strain curves of acrylonitrile butadiene styrene (ABS) and blends of ABS with 10 wt. % acrylonitrile butadiene rubber-41 mol % nitrile content, NBR41 (ABSNBR41-91) and ABS with 30 wt. % NBR41 (ABS-NBR41-73); FIG. 1B shows their corresponding tensile energy to break (the area under the stress-strain curves); FIG. 1C shows the stress-strain curves of ABS with 40 wt. % lignin (ABS-Lignin-64), ABS with 10 wt. % NBR41 and 40 wt. % lignin (ABS-NBR41-Lignin-514), ABS with 10 wt. % NBR41 and 30 wt. % lignin (ABS-NBR41-Lignin-613), and ABS with 10 wt. % NBR41 and 20 wt. % lignin (ABS-NBR41-Lignin-712); FIG. 1D shows their corresponding tensile energy to break; FIG. 1E shows stress strain curves, and FIG. 1F shows Young's modulus of ABS-NBR41-Lignin-514 in comparison to those of ABS with 10 wt. % NBR41, 40 wt. % lignin, and 10 wt.

% CFs (ABS-NBR41-Lignin-CF-4141), ABS with 10 wt. % NBR41, 30 wt. % lignin, and 10 wt. % CFs (ABS-NBR41-Lignin-CF-5131), and ABS with 10 wt. % NBR41, 20 wt. % lignin, and 10 wt. % CFs (ABS-NBR41-Lignin-CF-6121).

Figure 2A:
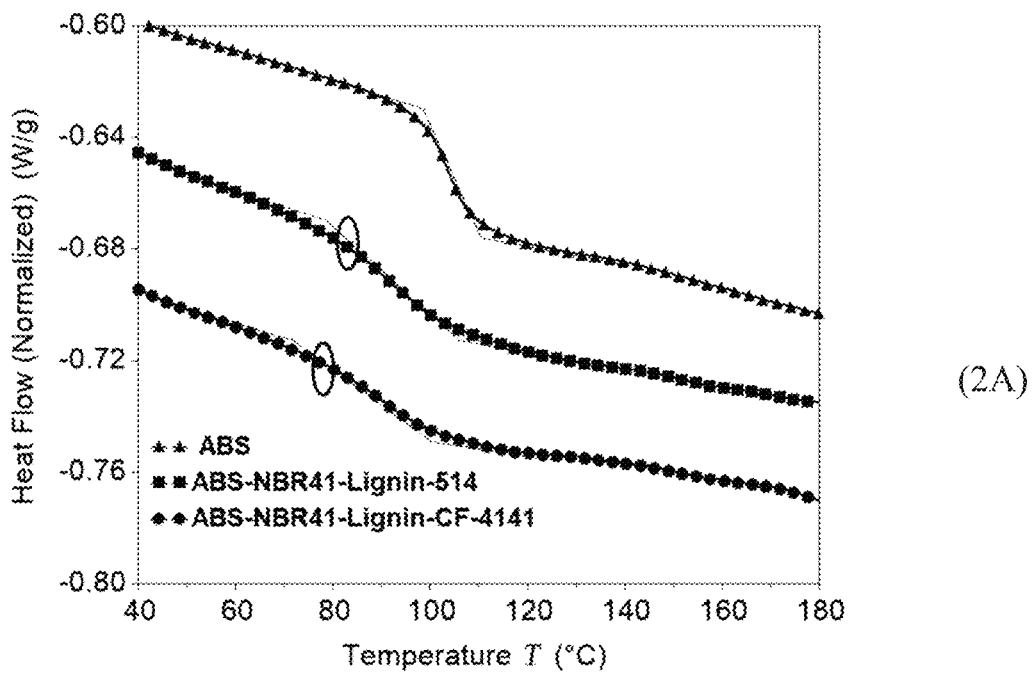
Figure 2B:
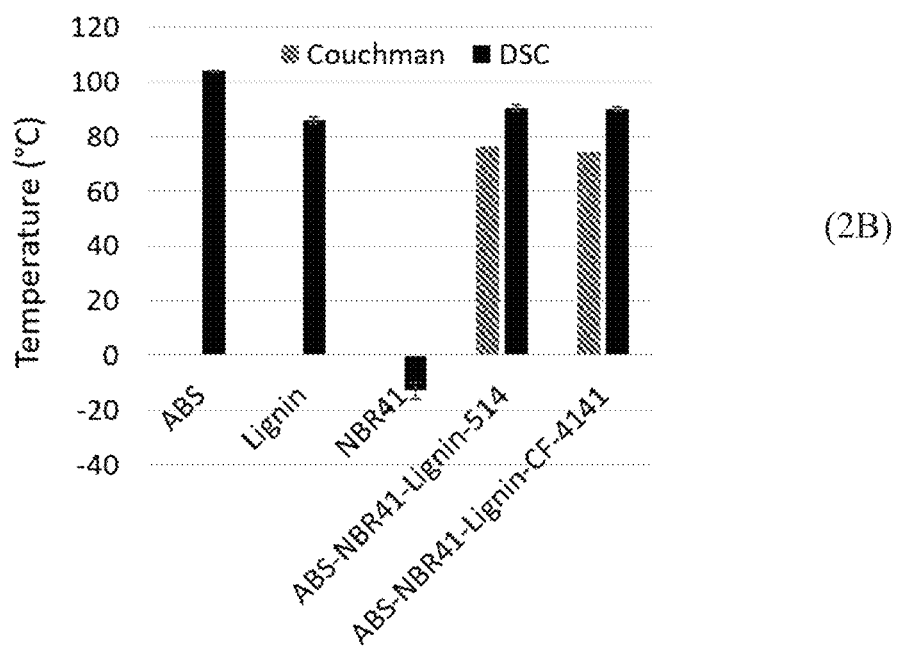

FIG. 2A is a graph showing the measured normalized heat flow as a function of temperature of three selected samples, namely ABS, ABS-NBR41-Lignin-514, and ABS-NBR41-Lignin-CF-4141. FIG. 2B is a graph showing glass transition temperatures ($T_g$) of these samples measured by DSC in comparison to the Couchman data. The Couchman data are also marked by the circles on the heat flow versus temperature curves.

Figure 3:
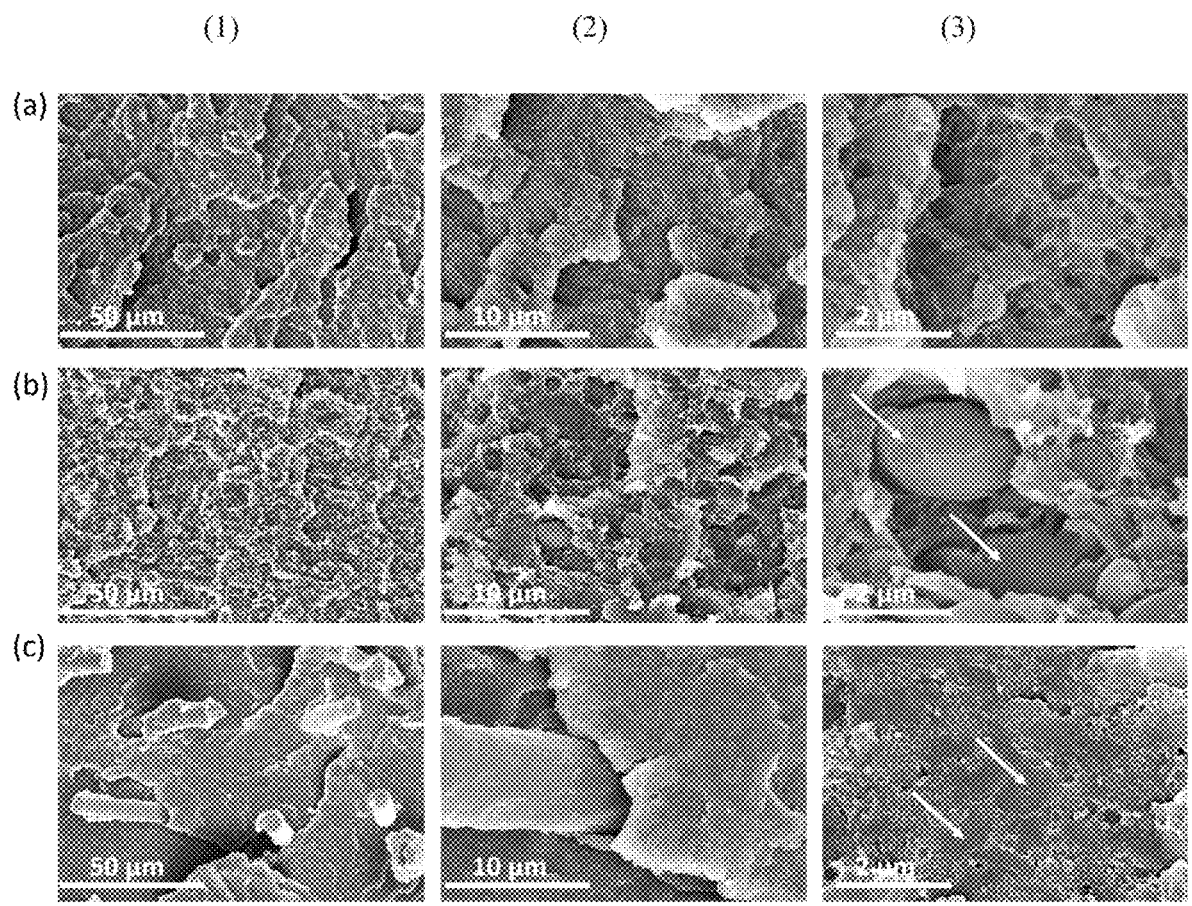

FIG. 3 contains a series of SEM images of representative fractured samples after tensile testing, including ABS, ABS-NBR41-Lignin-514 and ABS-NBR41-Lignin-CF-4141. In FIG. 3, panels (a-1), (a-2), and (a-3) show SEM images of ABS at progressively increasing magnification; panels (b-1), (b-2), and (b-3) show SEM images of ABS-NBR41-Lignin-514 at progressively increasing magnification; and panels (c-1), (c-2), and (c-3) show SEM images of ABS-NBR41-Lignin-CF-4141 at progressively increasing magnification.

Figure 4A:
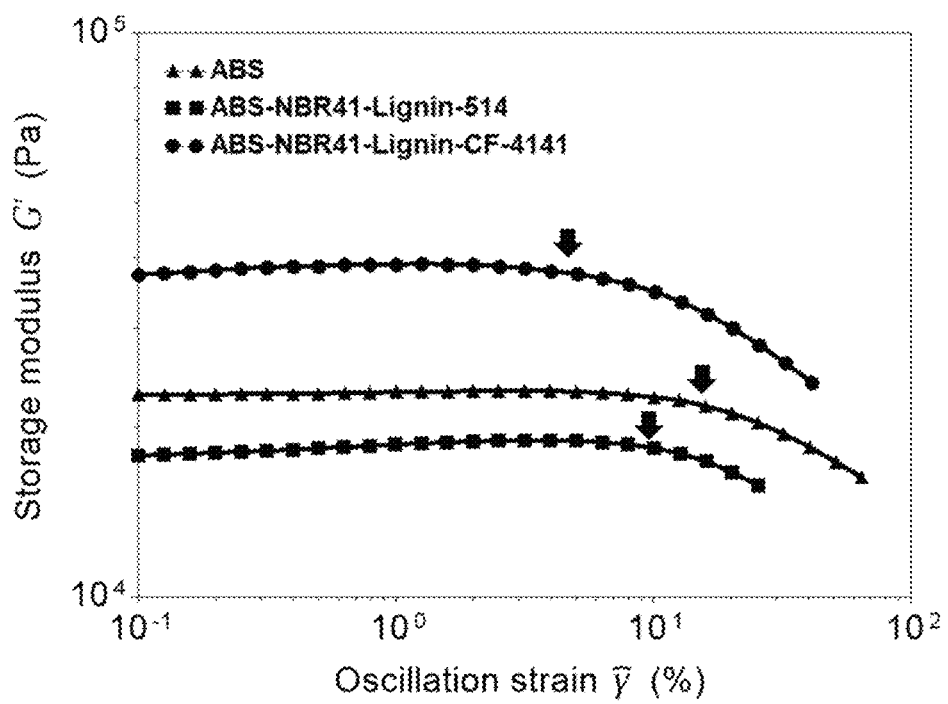
Figure 4B:
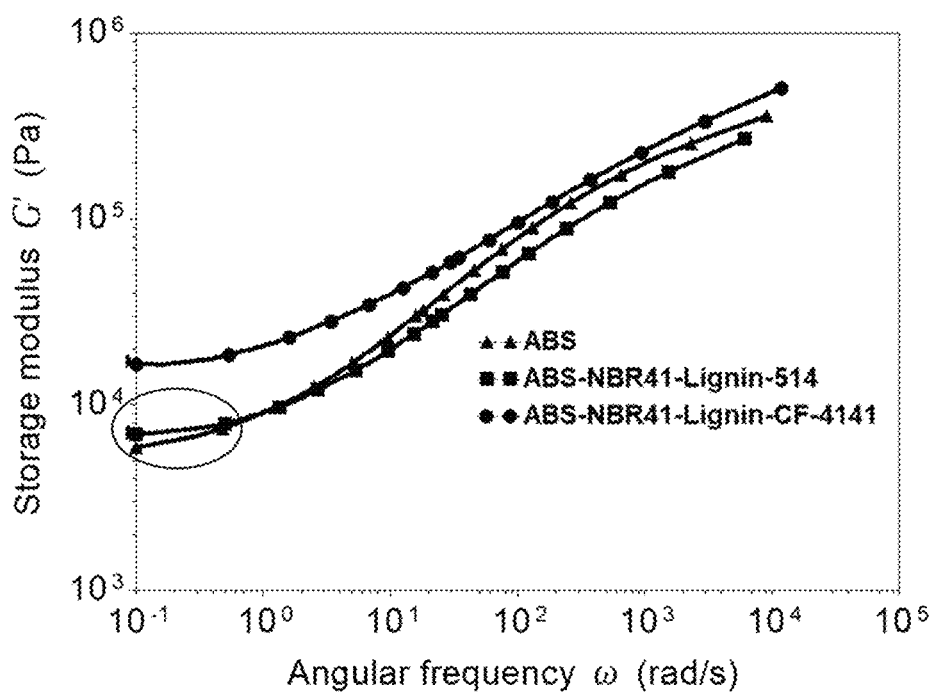
Figure 4C:
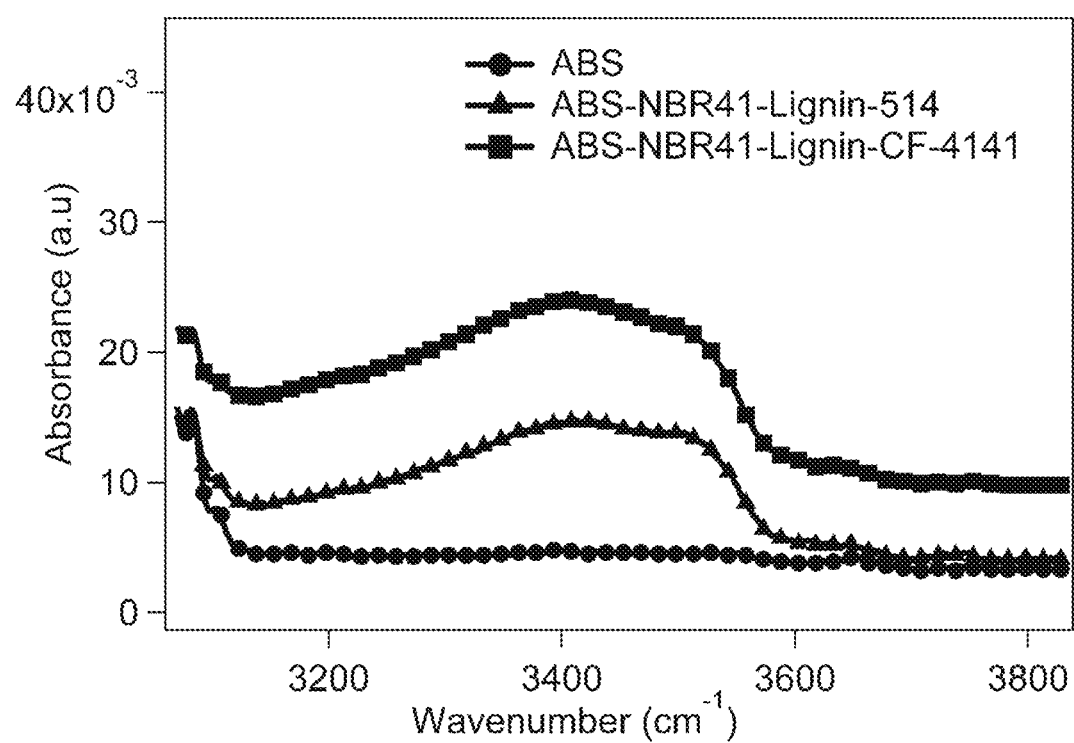
Figure 4D:
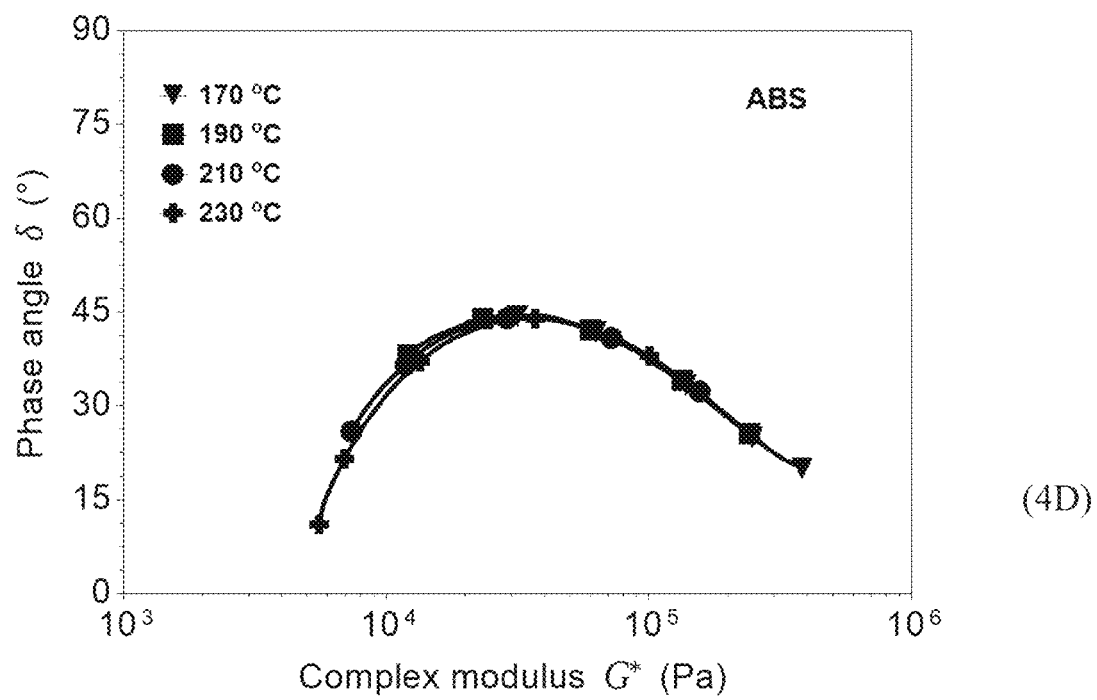
Figure 4E:
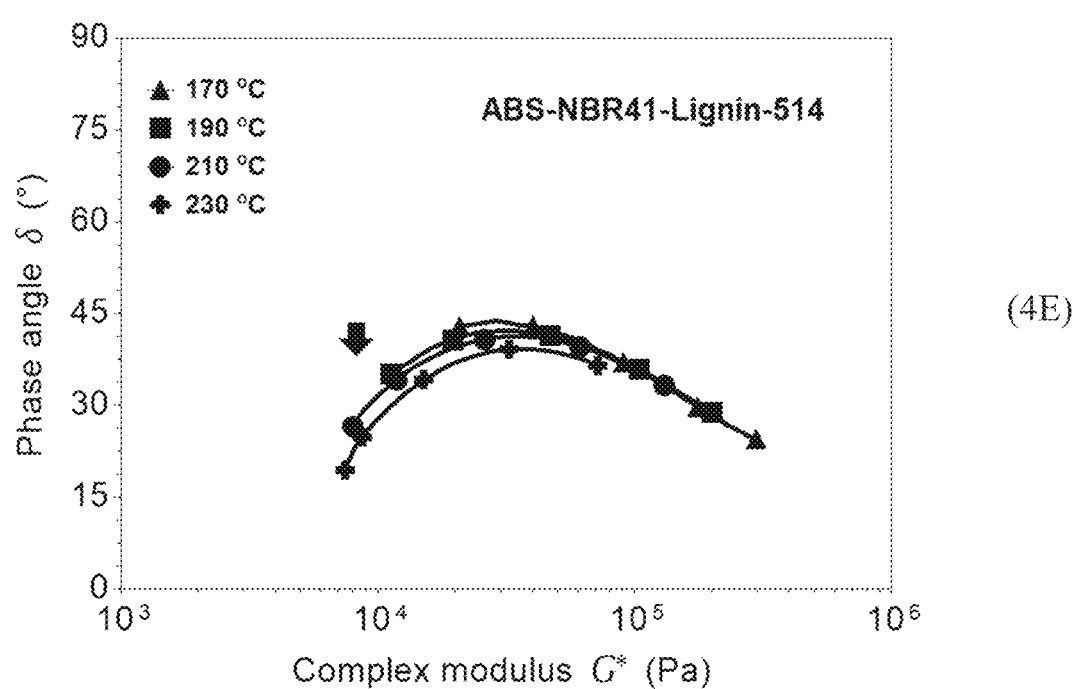
Figure 4F:
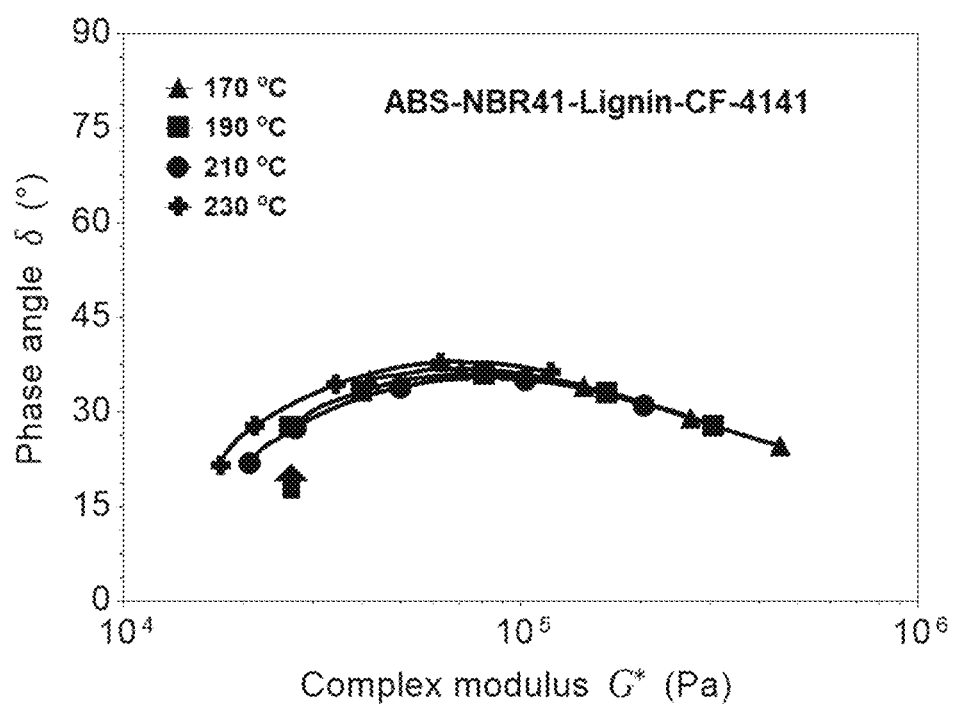

FIGS. 4A-4F are graphs showing storage modulus, absorbance and phase angle of the tested composites. FIG. 4A shows the storage modulus (G') as a function of oscillation strain; FIG. 4B shows G' versus angular frequency at a reference temperature of $T_{ref}=230°$ C. for ABS, ABS-NBR41-Lignin-514, and ABS-NBR41-Lignin-CF-4141 samples; FIG. 4C shows Fourier-transform infrared spectroscopy (FTIR) data of the studied samples; and FIGS. 4D-4F show van Gurp-Palmen plots of three selected samples measured at four different selected temperatures.

Figure 5A:
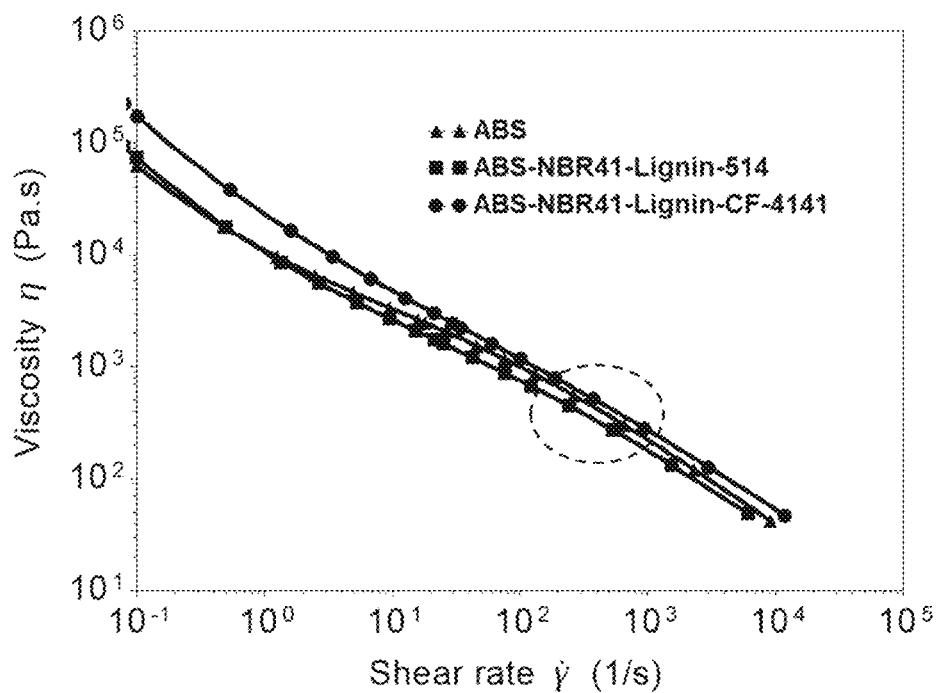
Figure 5B:
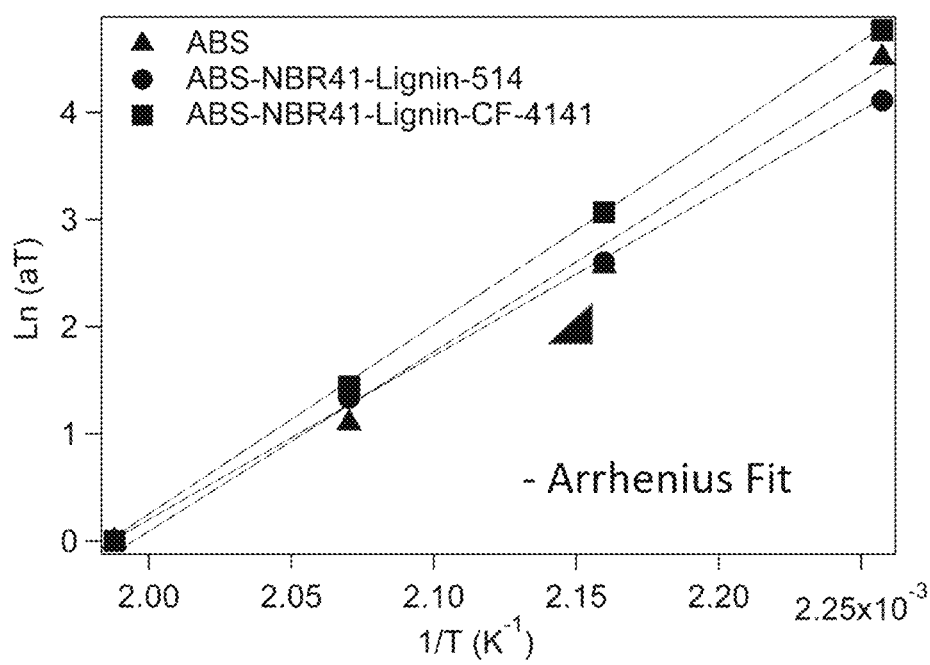
Figure 5C:
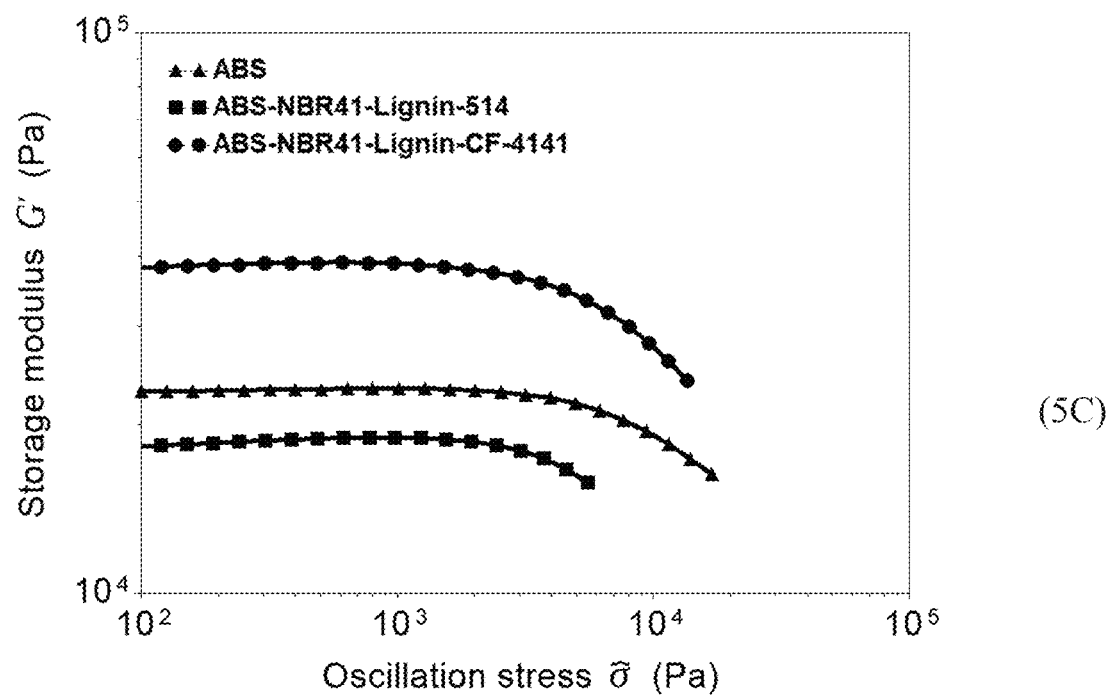
Figure 5D:
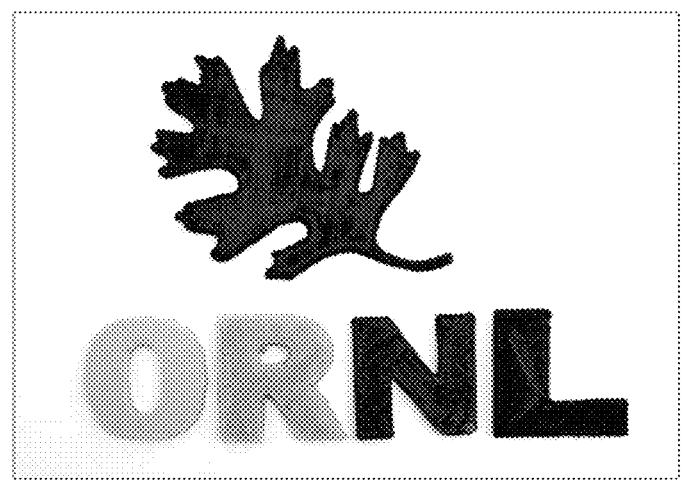

FIG. 5A is a plot of shear rate dependent viscosity of the studied samples at $T_{ref}=230°$ C. (constructed from the master curves and Cox-Merz rule). The dashed circle in FIG. 5A indicates a printing window. FIG. 5B plots the Arrhenius fitting of the shift factor (aT) as a function of the inverse temperature (1/T) obtained from the master curve construction. FIG. 5C plots G' as a function of oscillation stress at $T_{ref}=230°$ C. FIG. 5D shows examples of 3D-printed objects made from ABS ("O" and "R"), ABS-NBR41-Lignin-514 ("N"), and ABS-NBR41-Lignin-CF-4141 ("L" and the oak leaf).

DETAILED DESCRIPTION OF THE INVENTION

In a first aspect, the instant disclosure is directed to a solid polymer blend material that includes: (i) a lignin-acrylonitrile component containing a homogeneous blend of a lignin component and an acrylonitrile-containing rubber component; and (ii) a styrene-containing thermoplastic component that is non-elastomeric; wherein components (i) and (ii) and all components of the polymer blend (e.g., lignin, acrylonitrile-containing rubber, and styrene-containing thermoplastic) are homogeneously dispersed in the polymer blend material. The terms "polymer blend" and "homogeneously dispersed," as used herein, refer to a solid solution in which discrete microscopic regions of components (i) and/or (ii) are present. The polymer blend may exhibit substantial integration (i.e., near homogeneous) at the microscale or approaching the molecular level, but without losing each component's identity. Generally, one of the components (i) or (ii) functions as a matrix in which domains (i.e., particles or microscopic regions) of the other component (i) or (ii) are dispersed. Moreover, the sub-components in component (i), i.e., lignin and acrylonitrile rubber, are generally integrated as domains of one sub-component in the other, such as domains of lignin in a matrix of the acrylonitrile rubber. The domains generally have a size up to or less than 100 microns (100 μm). In different embodiments, the domains have a size up to or less than, for example, 50 μm, 10 μm, 5 μm (5000 nm), 2 μm (2000 nm), 1 μm (1000 nm), 800 nm, 500 nm, 200 nm, 100 nm, 50 nm, 25 nm, 10 nm, or 5 nm, or within a range bounded by any of these values. Any of the above exemplary domain sizes may alternatively represent a mean or median domain size, as found in a particle size distribution curve. For example, in some embodiments, at least 80%, 85%, 90%, or 95% of the domains have a size up to or less than any exemplary values provided above. In some embodiments, substantially all (e.g., above 95%) or all (i.e., 100%) of the domains have a size up to or less than any exemplary values provided above.

The lignin component, i.e., within the lignin-acrylonitrile component (i), can be any of the wide variety of lignin compositions found in nature in lignocellulosic biomass and as known in the art. As known in the art, the lignin compositions found in nature are generally not uniform. Lignin is a random copolymer that shows significant compositional variation between plant species. Many other conditions, such as environmental conditions, age, and method of processing, influence the lignin composition. Lignins are very rich aromatic compounds containing many hydroxyl (also possible carboxylic) functional groups attached differently in both aliphatic and phenolic groups. Additionally, lignins possess highly-branched structures. These characteristics of lignins determine their corresponding physical properties. Their molar mass or molecular weight ($M_w$) is low and has very broad distributions from approximately 1000 Dalton (D) to over 10,000 D. In some embodiments, the lignin is significantly deploymerized when isolated from native biomass source and has a molar mass of less than 1000 D. Their natural branches and low $M_w$ result in very brittle characteristics. The aromatic structures and rich functional groups of lignins also lead to varied rigid and thermal properties. Lignins are amorphous polymers, which results in very broad glass transition temperatures ($T_g$), from ca. 80° C. to over 200° C. The glass transition temperatures are critical temperatures at which the lignin macromolecular chains start moving and rotating. The ability to flow at a temperature above their $T_g$s is significant for 3D-printing applications. Some lignins exhibit a very good flow property (low molten viscosity), whereas others display several orders of magnitude higher viscosity. Understanding their flow properties is vital for selecting the appropriate lignin and lignin-derivatives for composite preparation and fabrication.

Lignins differ mainly in the ratio of three alcohol units, i.e., p-coumaryl alcohol, guaiacyl alcohol, and sinapyl alcohol. The polymerization of p-coumaryl alcohol, coniferyl alcohol, and sinapyl alcohol forms the p-hydroxyphenyl (H), guaiacyl (G) and syringyl (S) components of the lignin polymer, respectively. The precursor lignin can have any of a wide variety of relative weight percents (wt %) of H, G, and S components. As observed in some seeds, lignin may also consist of caffeyl alcohol units, e.g., Chen et al. PNAS, 109(5), 1772-1777 (2012). For example, the precursor lignin may contain, independently for each component, at least, up to, or less than 1 wt %, 2 wt %, 5 wt %, 10 wt %, 20 wt %, 30 wt %, 40 wt %, 50 wt %, 60 wt %, 70 wt %, 80 wt %, or 90 wt %, or within a range thereof, of any of the caffeyl alcohol, H, G, and S components. Typically, the sum of the wt % of each alcohol component is 100%, or at least 98% if other minor components are considered. Different wood and plant sources (e.g., hardwood (HW), such as oak, maple, poplar, and the like; softwood (SW), such as pine, spruce, and the like; or grass-derived lignins, such as switchgrass, corn, bamboo, perennial grass, orchard grass, alfalfa, wheat, *miscanthus*, bamboo, and bagasse) often widely differ in their lignin compositions, and are all considered herein as sources of lignin. In some embodiments, depending on the desired characteristics of the polymer blend material, any one or more types of lignin, as described above, may be excluded from the polymer blend material.

Besides the natural variation of lignins, there can be further compositional variation based on the manner in which the lignin has been processed. For example, the precursor lignin can be a Kraft lignin, sulfite lignin (i.e., lignosulfonate), or a sulfur-free lignin. As known in the art, a Kraft lignin refers to lignin that results from the Kraft process. In the Kraft process, a combination of sodium hydroxide and sodium sulfide (known as "white liquor") is reacted with lignin present in biomass to form a dark-colored lignin bearing thiol groups. Kraft lignins are generally water- and solvent-insoluble materials with a high concentration of phenolic groups. They can typically be made soluble in aqueous alkaline solution. As also known in the art, sulfite lignin refers to lignin that results from the sulfite process. In the sulfite process, sulfite or bisulfite (depending on pH), along with a counterion, is reacted with lignin to form a lignin bearing sulfonate ($SO_3H$) groups. The sulfonate groups impart a substantial degree of water-solubility to the sulfite lignin. There are several types of sulfur-free lignins known in the art, including lignin obtained from biomass conversion technologies (such as those used in ethanol production), solvent pulping (i.e., the "organosolv" process), and soda pulping. In particular, organosolv lignins are obtained by solvent extraction from a lignocellulosic source, such as chipped wood, followed by precipitation. Due to the significantly milder conditions employed in producing organosolv lignins (i.e., in contrast to Kraft and sulfite processes), organosolv lignins are generally more pure, less degraded, and generally possess a narrower molecular weight distribution than Kraft and sulfite lignins. These lignins can also be thermally devolatilized to produce a variant with less aliphatic hydroxyl groups, and molecularly restructured forms with an elevated softening point. Any one or more of the foregoing types of lignins may be used (or excluded) as a component in the method described herein for producing a polymer blend.

The lignin may also be an engineered form of lignin having a specific or optimized ratio of H, G, and S components. Lignin can be engineered by, for example, transgenic and recombinant DNA methods known in the art that cause a variation in the chemical structure in lignin and overall lignin content in biomass (e.g., F. Chen, et al., *Nature Biotechnology*, 25(7), pp. 759-761 (2007) and A. M. Anterola, et al., *Phytochemistry*, 61, pp. 221-294 (2002)). The engineering of lignin is particularly directed to altering the ratio of G and S components of lignin (D. Guo, et al., *The Plant Cell*, 13, pp. 73-88, (January 2001). In particular, wood pulping kinetic studies show that an increase in S/G ratio significantly enhances the rate of lignin removal (L. Li, et al., *Proceedings of The National Academy of Sciences of The United States of America*, 100 (8), pp. 4939-4944 (2003)). The S units become covalently connected with two lignol monomers; on the other hand, G units can connect to three other units. Thus, an increased G content (decreasing S/G ratio) generally produces a highly branched lignin structure with more C—C bonding. In contrast, increased S content generally results in more β-aryl ether (β-O-4) linkages, which easily cleave (as compared to C—C bond) during chemical delignification, e.g., as in the Kraft pulping process. It has been shown that decreasing lignin content and altering the S/G ratio improve bioconvertability and delignification. Thus, less harsh and damaging conditions can be used for delignification (i.e., as compared to current practice using strong acid or base), which would provide a more improved lignin better suited for higher value-added applications, including manufacturing of tough polymer blends, carbon materials production (e.g., carbon fiber, carbon powder, activated carbon, microporous and mesoporous carbon) and pyrolytic or catalytic production of aromatic hydrocarbon feedstock.

Lab-scale biomass fermentations that leave a high lignin content residue have been investigated (S. D. Brown, et al., *Applied Biochemistry and Biotechnology*, 137, pp. 663-674 (2007)). These residues will contain lignin with varied molecular structure depending on the biomass source (e.g., wood species, grass, and straw). Production of value-added products from these high quality lignins would greatly improve the overall operating costs of a biorefinery. Various chemical routes have been proposed to obtain value-added products from lignin (J. E. Holladay, et al., Top Value-Added Chemicals from Biomass: Volume II-Results of Screening for Potential Candidates from Biorefinery Lignin, DOE Report, PNNL-16983 (October 2007)).

The lignin may, in some embodiments, be a crosslinked lignin that is melt-processible or amenable to melt-processing. The term "crosslinked" can mean, for example, that the lignin contains methylene (i.e., —$CH_2$—) and/or ethylene (i.e., —$CH_2CH_2$—) linkages (i.e., linking groups) between phenyl ring carbon atoms in the lignin structure. By being "melt-processible" is meant that the crosslinked lignin can be melted or converted to a molten, highly viscous, or rubbery state starting at a particular glass transition temperature. The melted or highly viscous lignin can then be more easily processed, such as by mixing, molding, applying on a surface, or dissolving in a solvent. In some embodiments, the lignin is not crosslinked. In particular embodiments, the lignin component exhibits a suitable steady shear viscosity to render it as a malleable film-forming material at the processing temperature and shear rate employed. Typically, at a melt processing condition, the steady shear viscosity of the lignin component is at least or above 100 Pa·s, 500 Pa·s, 1000 Pa·s, or 2000 Pa·s, or within a range therein. In specific embodiments, lignin forms a highly viscous melt (on the order of 10,000 Pa·s complex viscosity or higher) at a 100 $s^{-1}$ shear rate. In some embodiments, the lignin may be oxidized (e.g., by exposure to chemical oxidizing agent), while in other embodiments, the lignin is not oxidized. In some embodiments, the lignin is chemically unmodified relative to its natural extracted or isolated form. In some embodiments, the lignin is chemically modified by acetylation, oxypropylation, hydroxymethylation, epoxidation, or the like, as known in the art. In some embodiments, the lignin is plasticized with solvents or plasticizers to induce melt-processability. Solvents and plasticizers include, for example, dimethylsulfoxide, dimethylacetamide, polyoxyalkylene, and glycerol, as known in the art. In some embodiments, the use of a solvent, plasticizer, crosslinker, or chemical modification is excluded.

The lignin may have a number-average or weight-average molecular weight (i.e., $M_n$ or $M_w$, respectively) of about, up to, or less than, for example, 300, 500, 1,000, 3,000, 5,000, 8,000, 10,000, 50,000, 100,000, 500,000 or 1,000,000 g/mol, [G. Fredheim et al., J. Chromatogr. A, 2002, 942, 191.; and A. Tolbert, et al., Biofuels, Bioproducts & Biorefining 8(6) 836-856 (2014)] wherein the term "about" generally indicates no more than ±10%, ±5%, or ±1% from an indicated value. The glass transition temperature ($T_g$) of the crosslinked lignin without any plasticizer or solvent is generally from ca. 80° C. to over 200° C. In different embodiments, the lignin (either isolated or extracted lignin from biomass or its crosslinked derivative) has a glass transition temperature of precisely or about, for example, 40° C., 50° C., 60° C., 70° C., 80° C., 90° C., 100° C., 105° C., 110° C., 115° C., 120° C., 125° C., 130° C., 140° C., 150° C., 160° C., 170° C., 180° C., 190° C., 200° C., 210° C., 220° C., 230° C., or 240° C., or a $T_g$ within a range bounded by any two of the foregoing values. The polymer blend material in which the lignin is incorporated may also possess any of the glass transition temperatures or ranges thereof provided above. The lignin has a decomposition temperature (Td) above its glass transition temperature. Generally, the lignin decomposes at a temperature at or above 240° C. In some embodiments, when catalyzed by chemicals or an external agent, the lignin decomposes at or below 240° C. Depending on the type of lignin, the lignin may have a decomposition temperature corresponding to any of the glass transition temperatures exemplified above starting at 150° C., e.g., a Td of 150° C., 160° C., 170° C., 180° C., 190° C., 200° C., 210° C., 220° C., 230° C., or 240° C., or a Td within a range bounded by any two of the foregoing values. In some embodiments, the lignin is highly crosslinked, and the glass transition temperature is very high. In those cases, the lignin decomposes before softening.

The lignin (in either raw form isolated from biomass or a crosslinked derivative) may be substantially soluble in a polar organic solvent or aqueous alkaline solution. As used herein, the term "substantially soluble" generally indicates that at least 1, 2, 5, 10, 20, 30, 40, 50, or 60 grams of the lignin completely dissolves in 1 deciliter (100 mL) of the polar organic solvent or aqueous alkaline solution. In other embodiments, the solubility is expressed as a wt % of the lignin in solution. In some embodiments, the lignin has sufficient solubility to produce at least a 5 wt %, 10 wt %, 15 wt %, 20 wt %, 30 wt %, 40 wt %, or 50 wt % solution in the polar organic solvent or aqueous alkaline solution. The polar organic solvent can be aprotic or protic. Some examples of polar aprotic solvents include the organoethers (e.g., diethyl ether, tetrahydrofuran, and dioxane), nitriles (e.g., acetonitrile, propionitrile), sulfoxides (e.g., dimethylsulfoxide), amides (e.g., dimethylformamide, N,N-dimethylacetamide), organochlorides (e.g., methylene chloride, chloroform, 1,1,-trichloroethane), ketones (e.g., acetone, 2-butanone), and dialkylcarbonates (e.g., ethylene carbonate, dimethylcarbonate, diethylcarbonate). Some examples of polar organic protic solvents include the alcohols (e.g., methanol, ethanol, isopropanol, n-butanol, t-butanol, the pentanols, hexanols, octanols, or the like), diols (e.g., ethylene glycol, diethylene glycol, triethylene glycol), and protic amines (e.g., ethylenediamine, ethanolamine, diethanolamine, and triethanolamine). The aqueous alkaline solution can be any aqueous-containing solution having a pH of at least (or over) 8, 9, 10, 11, 12, or 13. The alkalizing solute can be, for example, an alkali hydroxide (e.g., NaOH or KOH), ammonia, or ammonium hydroxide. Combinations of any of these solvents may also be used. In some embodiments, the lignin is dissolved in a solvent, such as any of the solvents described above, when used to form the polymer blend. The solvent may or may not be incorporated into the final polymer blend material. In some embodiments, one or more classes or specific types of solvents (or all solvents) are excluded from any of the components (i) or (ii) or from the polymer blend material altogether.

The acrylonitrile-containing rubber (elastomeric) component i.e., within the lignin-acrylonitrile component (i), can be any of the elastomers known in the art that include acrylonitrile units in combination with diene (e.g., butadiene) units. Generally, the acrylonitrile content is at least 20 mol %. In different embodiments, the acrylonitrile rubber component has an acrylonitrile content of about, at least, or above 20, 25, 30, 33, 35, 38, 40, 42, 45, 48, 50, 52, or 55 mol %, or an acrylonitrile content within a range bounded by any two of the foregoing values. The acrylonitrile-containing rubber generally possesses the known or expected physical attributes of nitrile butadiene rubber materials of the art, such as a substantial extensibility, as generally evidenced in a typical ultimate elongation of at least 50%, 100%, 150%, 200%, 250%, 300%, 350%, 400%, 450%, or 500%.

The acrylonitrile-containing copolymer rubber is constructed of (i.e., derived from) at least acrylonitrile units and diene monomer units. The term "diene," as used herein, refers to conjugated acyclic dienes, i.e., where the carbon-carbon double bonds are separated by a single carbon-carbon bond. In some embodiments, the diene possesses only carbon and hydrogen atoms, and optionally one or more halogen atoms. In other embodiments, the diene may include one or more functional groups that include oxygen and/or nitrogen atoms, such as those described in U.S. Pat. No. 6,583,260, which is herein incorporated by reference. Some examples of diene monomer units include, for example, butadiene (i.e., 1,3-butadiene), isoprene, chloroprene, 2-(cyanomethyl)-1,3-butadiene, and 2-(N,N-dimethylaminomethyl)-1,3-butadiene. The term "copolymer," as used herein, indicates the presence of at least two types of polymer units, wherein the at least two types of polymer units are typically present in random form or as blocks (i.e., segments), but in some cases may be engaged in alternating, periodic, branched, or graft form.

In some embodiments, the acrylonitrile rubber component contains only acrylonitrile and diene units. In the case of the acrylonitrile rubber component containing only acrylonitrile and butadiene units, it may be more specifically referred to as a "nitrile butadiene rubber" or "NBR" component. In other embodiments, the acrylonitrile rubber component contains acrylonitrile and diene units along with one or more other units, such as one or more of styrene, divinyl benzene, acrylate and methacrylate units. In some embodiments, the acrylonitrile rubber component contains functionalizing groups aside from nitrile and unsaturated carbon-carbon bonds, such as carboxy, hydroxy, ester, amino, or epoxy groups. In other embodiments, one or all of such functionalizing groups are excluded from the acrylonitrile rubber component. In some embodiments, any functionalizing groups capable of reacting with the lignin component (e.g., phenol- or hydroxy-reactive groups, such as epoxy or aldehyde groups) to form covalent bonds therewith are not present in the acrylonitrile rubber component. In some embodiments, the acrylonitrile rubber component contains only acrylonitrile and isoprene units, in which case it may be more specifically referred to as a "nitrile isoprene rubber" or "NIR" component.

The acrylonitrile-containing rubber can have any suitable weight-average molecular weight ($M_w$), such as precisely, about, at least, above, up to, or less than, for example, 2,500 g/mol, 3,000 g/mol, 5,000 g/mol, 10,000 g/mol, 50,000 g/mol, 100,000 g/mol, 150,000 g/mol, 200,000 g/mol, 300,000 g/mol, 400,000 g/mol, 500,000 g/mol, or 1,000,000 g/mol, or a molecular weight within a range bounded by any two of the foregoing exemplary values. The acrylonitrile rubber component may also have any suitable number-average molecular weight ($M_n$), wherein n can correspond to any of the numbers provided above for $M_w$.

In component (i), the above-described lignin and acrylonitrile-containing rubber components are homogeneously dispersed (blended) with each other to result in a lignin-acrylonitrile rubber blend. Such lignin-acrylonitrile rubber blends are described in detail in, for example, U.S. Pat. No. 9,815,985, the contents of which are herein incorporated by reference in their entirety. In the lignin-acrylonitrile component (i), the lignin component is present in an amount of at least 5 wt % and up to about 95 wt % by weight of the lignin and acrylonitrile-containing rubber components in component (i). As both the lignin and acrylonitrile-containing rubber components are present in the polymer blend in component (i), each component must be in an amount less than 100 wt %. In different embodiments, the lignin component is present in the polymer blend of component (i) in an amount of about, at least, or above, for example, 5, 10, 15, 20, 25, 30, 35, 40, 45, 50, 55, 60, 65, 70, 75, 80, 90, or 95 wt %, or in an amount within a range bounded by any two of the foregoing exemplary values, e.g., at least or above 15, 20, 25, 30, 35, or 40 wt %, and up to 45, 50, 55, 60, 65, or 70 wt % by total weight of components (i) and (ii). In more particular embodiments, the lignin component is present in the polymer blend of component (i) in an amount of 20, 25, 30, 35, or 40 wt %, and up to 45, 50, 55, or 60 wt % by total weight of the lignin and acrylonitrile-containing rubber components, or more particularly, at least 30, 35, or 40 wt %, and up to 45, 50, or 55 wt % by total weight of the lignin and acrylonitrile-containing rubber components.

Preferably, the polymer blend material of component (i) possesses a tensile yield stress of at least 5 MPa, or a tensile stress of at least 5 MPa at an elongation of 10%. In an exemplary composition of the instant disclosure, the polymer blend material of component (i) possesses an ultimate elongation (elongation at break) of at least or greater than 50% or 100%. In some embodiments, the polymer blend material of component (i) possesses a tensile stress of at least 5 MPa at an elongation of 100%. In a specific exemplary formulation of the instant disclosure, the polymer blend material of component (i) behaves as an elastomer with about or at least 10, 12, or 14 MPa of tensile strength and about or at least 200, 230, 250, 300, 400, or 500% of elongation at break. In another exemplary formulation of the instant disclosure, the polymer blend material of component (i) behaves as a toughened plastic with about 32 MPa and 150% or 160% of elongation at break. In yet another exemplary formulation of the instant disclosure, the polymer blend material of component (i) behaves as a thermoplastic elastomer that exhibits mechanical properties in between the two aforementioned formulations.

The styrene-containing thermoplastic in component (ii) is any polymer containing styrenyl units (i.e., from vinyl-addition polymerization) that behaves as a thermoplastic and is non-elastomeric. By being non-elastomeric, the styrene-containing thermoplastic has an elongation at break of less than 50%. Some examples of styrene-containing thermoplastics include acrylonitrile-butadiene-styrene (ABS), polystyrene (e.g., high impact polystyrene, also referred to as HIPS), styrene acrylonitrile copolymer, acrylate-styrene-acrylonitrile copolymer, styrene-methyl methacrylate copolymer, and styrene-maleic anhydride. The styrene-containing thermoplastic is present in an amount of 10-60 wt % by weight of the polymer blend material. Thus, in the event the styrene-containing thermoplastic (component ii) is present in an amount as low as 10 wt % by weight of the polymer blend, then component (i) may be present in an amount as high as 90 wt % (if no other components are included). In the event component (i) is present at 90 wt % by weight of the polymer blend, the lignin could be present in an amount of 4.5-85.5 wt % by weight of the polymer blend, since, as provided earlier above, the lignin can be present in an amount of 5-95 wt % of component (i). In the event the styrene-containing thermoplastic (component ii) is present in an amount as high as 60 wt % by weight of the polymer blend, then component (i) may be present in an amount as low as 40 wt % (if no other components are included). In the event component (i) is present at 40 wt % by weight of the polymer, the lignin could be present in an amount of 2-38 wt % by weight of the polymer blend, since, as provided earlier above, the lignin can be present in an amount of 5-95 wt % of component (i). Thus, when the weight of the styrene-containing thermoplastic is taken into account, the lignin may be present in an amount of about 2-85.5 wt % by weight of the polymer blend (or alternatively, by weight of components i and ii). The styrene-containing thermoplastic may be present at any wt % within the range of 10-60 wt %, e.g., 10, 15, 20, 25, 30, 35, 40, 45, 50, 55, or 60 wt %, or a wt % within a range bounded by any two of the foregoing values. Thus, considering the possible different relative amounts of the styrene-containing thermoplastic, the lignin in component (i) may be present in an amount of, for example, 2, 5, 10, 20, 30, 40, 50, 60, 70, 75, 80, or 85 wt % by weight of the polymer blend, or in an amount within a range bounded by any two of the foregoing values (e.g., 20-40 wt %, 20-50 wt %, or 20-60 wt %).

The styrene-containing thermoplastic (component ii) should have a $T_g$ or melting point that is below the decomposition temperature of the lignin-acrylonitrile component (i) with which component (ii) is to be blended. In various embodiments, component (ii) has a melting point of precisely, about, up to, or less than, for example, 150° C., 160° C., 170° C., 180° C., 190° C., 200° C., 210° C., 215° C., 220° C., 225° C., 230° C., 235° C., or 240° C., or a melting point within a range bounded by any two of the foregoing values.

The polymer blend material described herein may or may not also include one or more additional components. For example, in some embodiments, an agent that favorably modifies the physical properties (e.g., tensile strength, modulus, and/or elongation) may be included. Some of these modifying agents include, for example, carbon particles, metal particles, silicon-containing particles (e.g., silica or silicate particles), ether-containing polymers, Lewis acid compounds, solvents or plasticizers, and metal oxide compounds. In some embodiments, one or more such modifying agents are each independently, or in total, present in an amount of up to or less than 40, 30, 20, 15, 10, 5, 4, 3, 2, or 1 wt % by weight of the polymer blend material, or one or more such components are excluded from the polymer blend material.

The carbon particles, if present in the polymer blend material, can be any of the carbon particles known in the art that are composed at least partly or completely of elemental carbon, and may be conductive, semiconductive, or non-conductive. The carbon particles may be nanoparticles (e.g., at least 1, 2, 5, or 10 nm, and up to 20, 50, 100, 200, or 500 nm), microparticles (e.g., at least 1, 2, 5, or 10 μm, and up to 20, 50, 100, 200, or 500 μm), or macroparticles (e.g., above 500 μm, or at least or up to 1, 2, 5, 10, 20, 50, or 100 mm). Some examples of carbon particles include carbon black ("CB"), carbon onion ("CO"), a spherical fullerene (e.g., buckminsterfullerene, i.e., $C_{60}$, as well as any of the smaller or larger buckyballs, such as $C_{20}$ or $C_{70}$), a tubular fullerene (e.g., single-walled, double-walled, or multi-walled carbon nanotubes), carbon nanodiamonds, carbon nanohorns, and carbon nanobuds, all of which have compositions and physical and electrical properties well-known in the art. As known in the art, fully graphitized carbon nanodiamonds can be considered to be carbon onions.

In some embodiments, the carbon particles are made exclusively of carbon, while in other embodiments, the carbon particles can include an amount of one or a combination of non-carbon non-hydrogen (i.e., hetero-dopant) elements, such as nitrogen, oxygen, sulfur, boron, silicon, phosphorus, or a metal, such as an alkali metal (e.g., lithium), alkaline earth metal, transition metal, main group metal (e.g., Al, Ga, or In), or rare earth metal. Some examples of binary carbon compositions include silicon carbide (SiC) and tungsten carbide (WC). The amount of hetero element can be a minor amount (e.g., up to 0.1, 0.5, 1, 2, or 5 wt % or mol %) or a more substantial amount (e.g., about, at least, or up to 10, 15, 20, 25, 30, 40, or 50 wt % or mol %). In some embodiments, any one or more of the specifically recited classes or specific types of carbon particles or any one or more of the specifically recited classes or specific types of hetero-dopant elements are excluded from the carbon particles.

In some embodiments, the carbon particles can be nanoscopic, microscopic, or macroscopic segments of any of the high strength continuous carbon fiber compositions known in the art. Some examples of carbon fiber compositions include those produced by the pyrolysis of polyacrylonitrile (PAN), viscose, rayon, pitch, lignin, and polyolefins, any of which may or may not be heteroatom-doped, such as with nitrogen, boron, oxygen, sulfur, or phosphorus. The carbon fiber may alternatively be vapor grown carbon nanofibers. The carbon particles may also be two-dimensional carbon materials, such as graphene, graphene oxide, or graphene nanoribbons, which may be derived from, for example, natural graphite, carbon fibers, carbon nanofibers, single walled carbon nanotubes and multi-walled carbon nanotubes. The carbon fiber typically possesses a high tensile strength, such as at least 500, 1000, 2000, 3000, 5000, 7,000, or 10,000 MPa, or higher, with a degree of stiffness generally of the order of steel or higher (e.g., 100-1000 GPa). In some embodiments, any one or more classes or specific types of the foregoing carbon particles are excluded from the polymer blend.

An ether-containing polymer, if present in the polymer blend material, can be, for example, a polyalkylene oxide (i.e., polyethylene glycol) or a copolymer thereof. Some examples of polyalkylene oxides include the polyethylene oxides, polypropylene oxides, polybutylene oxides, and copolymers thereof or with ethylene, propylene, or allyl glycidyl ether. The ether-containing polymer may also be, for example, a polyvinyl cyanoethyl ether, as described in, for example, U.S. Pat. No. 2,341,553, the contents of which are herein incorporated by reference. The ether-containing polymer may also be, for example, an etherified form of PVA, such as poly(vinyl methyl ether), which may correspond to CAS No. 9003-09-2. The ether-containing polymer may also be, for example, a phenyl ether polymer, which may be a polyphenyl ether (PPE) or polyphenylene oxide (PPO). The ether-containing polymer may also include cyclic ether groups, such as epoxide or glycidyl groups, or as further described in, for example, U.S. Pat. No. 4,260,702, the contents of which are herein incorporated by reference. The cyclic ether polymer may also be a cyclic anhydride modified polyvinyl acetal, as further described in U.S. Pat. No. 6,555,617, or a cyclic or spirocyclic polyacetal ether, as further described in, for example, A. G. Pemba, et al., $Polym. Chem.$, 5, 3214-3221 (2014), the contents of which are herein incorporated by reference. In yet other embodiments, the ether-containing polymer may be a cyclic or non-cyclic thioether-containing polymer, such as a polyphenyl thioether or polyphenylene sulfide. In some embodiments, any one or more classes or specific types of the foregoing ether-containing polymers are excluded from the polymer blend.

Lewis acid compounds, if present in the polymer blend material, can be any of the compounds known in the art having Lewis acid character, i.e., strongly electrophilic by virtue of a deficiency of electrons. Some examples of Lewis acid compounds include boron-containing compounds (e.g., boric acid, borates, borate esters, boranes, and boron halides, such as $BF_3$, $BCl_3$, and $BBr_3$), aluminum-containing compounds (e.g., aluminum hydroxide, aluminates, aluminate esters, and aluminum halides, such as $AlF_3$, $AlCl_3$, and $AlBr_3$), and tin-containing compounds, such as stannic acid, tin esters (e.g., tin(II) acetate or tin(II) 2-ethylhexanoate), tin alkoxides (e.g., tin(IV) ethoxide), and tin halides, such as $SnF_4$, $SnCl_4$, $SnBr_4$, and $SnI_4$. In some embodiments, any one or more classes or specific types of the foregoing Lewis acid compounds are excluded from the polymer blend.

Metal oxide compounds, if present in the polymer blend material, can have any metal oxide composition, typically particulate in form, that can function to improve a physical characteristic of the polymer blend material. The metal of the metal oxide composition can be, for example, an alkali metal, alkaline earth metal, main group metal, transition metal, or lanthanide metal. Some examples of alkali metal oxides include $Li_2O$, $Na_2O$, $K_2O$, and $Rb_2O$. Some examples of alkaline earth metal oxide compositions include BeO, MgO, CaO, and SrO. Some examples of main group metal oxide compositions include $B_2O_3$, $Ga_2O_3$, SnO, $SnO_2$, PbO, $PbO_2$, $Sb_2O_3$, $Sn_2O_5$, and $Bi_2O_3$. Some examples of transition metal oxide compositions include $Sc_2O_3$, $TiO_2$, $Cr_2O_3$, $Fe_2O_3$, $Fe_3O_4$, FeO, $Co_2O_3$, $Ni_2O_3$, CuO, $Cu_2O$, ZnO, $Y_2O_3$, $ZrO_2$, $NbO_2$, $Nb_2O_5$, $RuO_2$, PdO, $Ag_2O$, CdO, $HfO_2$, $Ta_2O_5$, $WO_2$, and $PtO_2$. Some examples of lanthanide metal oxide compositions include $La_2O_3$, $Ce_2O_3$, and $CeO_2$. In some embodiments, any one or more classes or specific types of the foregoing metal oxides (or all metal oxides) are excluded from the polymer blend.

Metal particles, if present in the polymer blend material, may be included to modulate the electrical conductivity, thermal conductivity, strength, or magnetic properties of the produced object. The metal particles may be composed of or include, for example, iron, cobalt, nickel, copper, zinc, palladium, platinum, silver, gold, aluminum, silicon, or tin, or a combination thereof. The metal particles may include at least a portion of the metal in its elemental (zerovalent) state. The metal particles may alternatively have a metal carbide, metal nitride, or metal silicide composition. In some embodiments, any one or more classes or specific types of the foregoing metal particles (or all metal particles) are excluded from the polymer blend.

A halogen-containing polymer, which may also function as a modifying agent, may or may not be present in the polymer blend material. The halogen-containing polymer, if present in the polymer blend material, can have the halogen atoms bound to aliphatic (i.e., non-aromatic, e.g., alkyl or alkenyl) or aromatic groups, as described above for a hydroxy-containing polymer. The halogen atoms can be, for example, fluorine, chlorine, and bromine atoms. Some examples of fluorinated polymers include poly(vinyl fluoride), poly(vinylidene fluoride), poly(tetrafluoroethylene), fluorinated ethylene-propylene copolymer, poly(ethylenetetrafluoroethylene), poly(perfluorosulfonic acid), and fluoroelastomers. Some examples of chlorinated polymers include poly(vinyl chloride), polyvinylidene chloride, ethylene-chlorotrifluoroethylene copolymer, polychloroprene, halogenated butyl rubbers, chlorinated polyethylene, chlorosulfonated polyethylene, chlorinated polypropylene, chlorinated ethylene-propylene copolymer, and chlorinated polyvinyl chloride. Some examples of brominated polymers include poly(vinyl bromide), and brominated flame retardants known in the art, such as brominated epoxy, poly (brominated acrylate), brominated polycarbonate, and brominated polyols.

In another aspect, the present disclosure is directed to methods for producing the polymer blend material described above. The process generally employs melting and blending of the components; thus, the process may be referred to as a "melt blending" process. The process for preparing the polymer blend material can employ any of the weight percentages (i.e., wt %) of components provided in the above earlier description of the polymer blend material. In the method, at least (or only) the components (i) and (ii) are mixed and homogeneously blended to form the polymer blend material. Any one of the components can be included in liquid form (if applicable), in solution form, or in particulate or granular form. In the case of particles, the particles may be, independently, nanoparticles (e.g., at least 1, 2, 5, or 10 nm, and up to 20, 50, 100, 200, or 500 nm), microparticles (e.g., at least 1, 2, 5, or 10 μm, and up to 20, 50, 100, 200, or 500 μm), or macroparticles (e.g., above 500 μm, or at least or up to 1, 2, 5, 25, 50, 100, 500, or 1000 mm). Typically, if a polymeric component is provided in particle or granular form, the particles are melted or softened by appropriate heating to permit homogeneous blending and uniform dispersion of the components. The temperature employed for melting the components should be below the decomposition temperature of the lignin, generally a temperature of no more than or less than 200° C., 210° C., 220° C., 230° C., or 240° C. The components can be homogeneously blended by any of the methodologies known in the art for achieving homogeneous blends of solid, semi-solid, gel, paste, or liquid mixtures. Some examples of applicable blending processes include simple or high speed melt mixing, compounding, extrusion, two-roll milling, or ball mixing, all of which are well-known in the art. In some embodiments, one or more of the components are in solid bale form and these are cut into useable chunks using standard bale cutting tools. The chunks of the components are typically mixed, melted, and blended (melt blended) in an internal mixer, such as a Banbury mixer. In other embodiments, one or more of the components are in sheet form and the components are mixed in a two-roll mill. For purposes of the present invention, the polymer blend should exhibit a melt viscosity of no more than 500, 1000, 1500, or 2000 Pa·s at a shear rate of 100-1000 s$^{-1}$ when heated to a temperature of no more than 240° C.

The melt blending process is conducted at a temperature at which the components (i) and (ii) melt, provided that the temperature is below the decomposition temperature of the lignin. For example, the melt process may be conducted at a temperature of at least or above 100° C., 120° C., 130° C., 140° C., or 150° C., and up to or less than 160° C., 170° C., 180° C., 190° C., 200° C., 210° C., 220° C., 230° C., or 240° C., or within a range bounded by any two of the foregoing temperatures. In some embodiments, in order to provide the melt of the polymer blend material with the proper viscosity and toughness to be melt extruded to form an object, the melt of the polymer blend material may be subjected to a suitable shear rate, such as a shear rate within a range of 100-1000 s$^{-1}$ (for sufficient time) to achieve a melt viscosity of no more than 2000, 1500, 1000, or 500 Pa·s. In different embodiments, a shear rate of precisely or about 100, 150, 200, 250, 300, 350, 400, 450, 500, 600, 700, 800, 900, 1000, 2000, 3000, 4000, 5000, 10,000, 15,000, or 20,000 s$^{-1}$ is employed, or a shear rate within a range bounded by any two of the foregoing values is employed, to result in a melt viscosity of precisely, about, up to, or less than, for example, 2000, 1500, 1250, 1000, 900, 800, 700, 600, 500, 400, 300, 200, or 100 Pa·s, or a melt viscosity within a range bounded by any two of the foregoing values.

The result of the above process is a polymer blend material in melt or solid form in which the components are homogeneously blended (i.e., components (i) and (ii) are homogeneously dispersed in each other). By being "homogeneously blended" is meant that, in the macro (e.g., millimeter) scale, no discernible regions of at least components (i) and (ii) or sub-components therein exist in the polymer blend material produced by the above process. If a modifying agent, as discussed above, is included, all or a portion of the modifying agent may or may not remain in the solid (unmelted) phase, e.g., either in elemental state (e.g., carbon particles) or in crystalline lamella phase (e.g., polyethylene oxide). In other words, the homogeneous blend may possess a modified or compatibilized phase structure (not necessarily a single phase structure, but often with retained but shifted $T_g$ associated with individual phases) for at least components (i) and (ii). The modified-phase structure generally indicates near homogeneous integration at microscale or near the molecular level without losing each component's identity. In the case of an additional non-homogeneous component, the instantly described polymer blend including components (i) and (ii) can be viewed as a "homogeneous matrix" in which the additional non-homogeneous component is incorporated. In preferred embodiments, each of the components retain their identities, and the components are well dispersed at the nanometer scale.

In another aspect, the invention is directed to a method for producing an object made of the solid polymer blend material described above. Since the melt of the solid polymer blend material has low viscosity (no more than 2000 Pa·s) the melt flows very easily. In this invention, the ease of flow of the melt is exploited to form an object at a faster rate (volume of materials that can exit a die per unit time). In one set of embodiments, the polymer blend produced by melt blending in step (a) is in melt form, and the melt is formed into an object, such as by employing an extrusion or casting process on the melt. In another set of embodiments, the polymer blend produced by melt blending in step (a) is in solid form (i.e., after sufficient cooling and solidification), and the solid polymer blend is used as a feed material in a shape-forming or object-building process in which the solid polymer blend is melted in a successive step and then formed into an object as above, such as by employing an extrusion or casting process on the melt. Notably, the melting process, whether on the components (i) and (ii) during blending, or on the solid polymer blend, should be below the decomposition temperature of the lignin.

In some embodiments, the melting process occurs in a heating chamber containing a nozzle, and pressure is induced on the melt of the polymer blend material while the polymer blend material is in the heating chamber to adjust the flow rate of the melt through the nozzle to result in the melt having a melt viscosity of no more than 2000, 1500, 1000, 800, or 500 Pa·s. By one exemplary method, the heating chamber is connected to (which may include being in contact with) a piston that induces pressure on the melt of the polymer blend material as the piston pushes the melt through the nozzle. By another exemplary method, pressure is induced on the melt of the polymer blend material by exerting pressure on a solid filament of the polymer blend material as the solid filament is being fed into the heating chamber, wherein the pressure pushes the solid filament into the heating chamber at a desired flow rate. In other embodiments, the polymer blend is provided with the desired melt viscosity by subjecting the melt to a suitable shearing force, such as any of the shearing forces described above.

The melting process is conducted at a temperature at which components (i) and (ii) melts, which is generally well above the temperature at which the lignin melts, provided that the temperature is also below the decomposition temperature of the lignin. For example, the melt process may be conducted at a temperature of at least or above 100° C., 120° C., 130° C., 140° C., or 150° C., and up to or less than 160° C., 170° C., 180° C., 190° C., 200° C., 210° C., 220° C., 230° C., or 240° C., or within a range bounded by any two of the foregoing temperatures. In some embodiments, in order to provide the melt of the polymer blend material with the proper viscosity and toughness to be melt extruded to form an object, the melt of the polymer blend material be subjected to a shear rate within a range of 100-1000 $s^{-1}$ (for sufficient time) to achieve a melt viscosity of no more than 2000, 1500, 1000, 800, or 500 Pa·s. In different embodiments, a shear rate of precisely or about 100, 150, 200, 250, 300, 350, 400, 450, 500, 600, 700, 800, 900, 1000, 2000, 3000, 4000, 5000, 10,000, 15,000, or 20,000 $s^{-1}$ is employed, or a shear rate within a range bounded by any two of the foregoing values is employed, to result in a melt viscosity of precisely, about, up to, or less than, for example, 2000, 1500, 1250, 1000, 900, 800, 700, 600, 500, 400, 300, 200, or 100 Pa·s, or a melt viscosity within a range bounded by any two of the foregoing values.

In a first set of embodiments, the melted polymer blend is subjected to casting process to form an object. The casting process can be, for example, injection molding, or more specifically, a resin transfer molding process, all of which are well known in the art. The casting process may alternatively be a compression molding process, as also well known in the art.

In a second set of embodiments, the melted polymer blend is subjected to a melt extrusion process to produce a desired shape of the polymer blend. The melt extrusion process can be, for example, any of the additive manufacturing (AM) processes known in art. In the AM process, the solid polymer blend material or a melt version of the blend material can be used as feed material in an AM device. In the case where solid polymer blend material is used as feed material, the AM device typically includes device components (e.g., a chamber with required heating and mixing elements) for melting, mixing, and applying the necessary pressure and/or shear forces to the polymer blend material to provide the melt with the necessary viscosity. The AM process can be any of the additive processes well known in the art, such as a rapid prototyping (RP) unit, or more particularly, a fused deposition modeling (FDM) unit or a fused filament fabrication (FFF) device. The AM device may be, more particularly, a 3D printer. As well known in the art, the additive process (particularly FDM or 3D printing process) generally operates by hot extruding the build material (in this case, the polymer blend material) through a die or nozzle of suitable shape, and repeatedly depositing discrete amounts (e.g., beads) of the build material in designated locations to build an object. The temperature of the melted polymer blend material, when exiting the nozzle, can be any of the temperatures, as provided above, at which melting is conducted, or a temperature at which the polymer blend material is extrudable but not in a completely melted state, i.e., a temperature slightly below (e.g., 1-10° C. below) the melting temperature of the polymer blend material. In some embodiments, to form the melt, the solid polymer blend is subjected to a temperature of at least or above the glass transition temperature and no more than 10° C. above the glass transition temperature of the solid polymer blend material and no more than 240° C. (the degradation temperature of lignin) to produce a melt of the solid polymer blend material.

Upon exiting the die (i.e., nozzle) in the AM unit, the polymer blend material cools and solidifies. In the FDM or 3D printing process, the nozzle is moved in precise horizontal and vertical positions as beads of the polymer blend material are deposited. In this way, the additive process can build an object layer by layer using the feed material. The nozzle movements and flow rate are generally controlled by computer software, typically a computer-aided manufacturing (CAM) software package. The FDM or 3D printer builds an object (article) based on instructions provided by a computer program that includes precise specifications of the object (article) to be constructed. The object may be useful as, for example, a structural support, such as a component of the interior or exterior of an automobile, furniture, a tool or utensil, or a structural object (e.g., sheet or plate). In some embodiments, the polymer blend may correspond to a coating or film, such as a protective film.

The flow rate of the polymer blend material (e.g., through a nozzle) can also be suitably modulated to adjust the melt viscosity of the polymer blend material. The flow rate of the melt can be controlled by varying the material feed rate during the printing process and by adjusting the printing nozzle size. The following table includes some exemplary values of material feed rate (v, in mm/s) and nozzle size (R, in mm) that can result in an acceptable melt viscosity and stiffness of the polymer blend material for use in an additive manufacturing process. In some embodiments, a particular range in nozzle size (radius) and/or feed rate may be selected from Table A below, with possible exclusion of some of the nozzle sizes and/or feed rates shown in Table A. Table A shows the effect of v and R on shear rate ($\gamma$), where $\gamma = 4Q/\pi R^3$ (where the shear rates with astericks may be preferred).

TABLE A

Shear rate ($s^{-1}$) equivalent for three selected filament feed rates (mm/s) for various radii of printing nozzle (mm)

| R (radius of printing nozzle, mm) | Feed rate of 200 mm/s | Feed rate of 100 mm/s | Feed rate of 50 mm/s |
| --- | --- | --- | --- |
| 1 | 800 | 400 | 200 |
| 0.75 | 1067 | 533 | 367 |
| 0.5 | 1600* | 800* | 400* |
| 0.35 | 2286* | 1143* | 571* |
| 0.25 | 3200 | 1600 | 800 |
| 0.15 | 5333 | 2667 | 1333 |
| 0.1 | 8000 | 4000 | 2000 |

*may be preferred shear rates

Examples have been set forth below for the purpose of illustration and to describe certain specific embodiments of the invention. However, the scope of this invention is not to be in any way limited by the examples set forth herein.

EXAMPLES

Lignin is one of the most abundant renewable materials. It plays a vital role in providing a supporting structure for plant cells in which the cellulose microfibrils are surrounded by lignin molecules. The present research effort is to mimic nature by utilizing lignin as a supporting skeleton for the sustainable 3D-printed composites. By better understanding the effects of the lignin structural units and available linkages, lignin was employed for sustainable FDM. Here, the goal was to modify an ABS-based FDM feedstock with lignin and produce materials with enhanced mechanical performance.

In this experiment, lignin was integrated with acrylonitrile butadiene rubber 41 (41 mol % of nitrile content, NBR41) and ABS to synthesize green and high-performance 3D-printing materials. Usage of NBR41 was found to enhance the toughness of the lignin-based 3D-printing composites. The presence of nitrile groups in NBR41 and ABS improves the interfacial interactions within the composites by the formation of hydrogen bonding with plentiful hydroxyl groups of lignin. Thus, the deleterious effects of lignin incorporation in ABS are alleviated by compatibilization with a minor fraction of NBR. Physical and chemical crosslinks between lignin and NBR improves lignin dispersion in the ABS matrix. In fact, the presence of only 10 wt. % NBR41 permits an increase in lignin loading up to 40 wt. % while demonstrating comparable mechanical properties as petroleum-based thermoplastics and exhibiting excellent 3D-printability. Discontinuous carbon fibers (CFs) were utilized at 10 wt. % loading to further reinforce the materials and control local relaxation of the materials to enhance the interlayer adhesion in printed objects. Morphological characteristics of the composites are herein reported and correlated with thermal, rheological, and mechanical properties of this class of renewable composites with excellent 3D-printability.

Composite Synthesis

Different weight ratios of ABS, NBR41, lignin, and CFs were melt-mixed at 200° C. and 90 rpm using a Brabender® Plasti-Corder Torque Rheometer. First, ABS was loaded into a half-size (30 cc) mixing chamber and pre-sheared/mixed with high-shear twin roller blades for 2 minutes before adding NBR41, lignin and CFs. The total mixing time was 30 minutes. After mixing, the samples were collected and stored at room temperature before pressing to make films or extruding filaments for characterization and printing. A hydraulic Carver press was utilized to press the composites at 200° C. and 4 metric tons for 20 minutes.

Rheological Measurements

Rheological characteristics of two high loading lignin-based composites, ABS-NBR41-Lignin-514 (50 wt. % ABS, 10 wt. % NBR41, and 40 wt. % lignin) and ABS-NBR41-Lignin-CF-4141 (40 wt. % ABS, 10 wt. % NBR41, 40 wt. % lignin, and 10 wt. % CFs) in comparison to the neat ABS were investigated by using the Discovery Hybrid Rheometer (DHR-3, TA instruments). All measurements were conducted in a nitrogen atmosphere using 8 mm diameter parallel plates with a sample gap of ca. 0.4 mm. Strain sweeps at 10 rad/s at investigated temperatures were performed to determine the linear viscoelastic response of the materials. Frequency sweeps from 100 rad/s to 0.1 rad/s at four different temperatures, 170° C., 190° C., 210° C., and 230° C., were performed. Time-temperature superposition was applied to construct the master curves at a selected reference temperature (230° C.) to investigate the 3D-printing characteristics of the lignin-based composites. All measurements were performed in the linear regions (very small strain amplitude).

Printing Process

Neat pellet ABS, ABS-NBR41-Lignin-514, and ABS-NBR41-Lignin-CF-4141 were selected to make filaments for 3D-printing tests. A custom designed extruder equipped with a single die was used to extrude the materials at 210° C. The average diameter of the extruded filaments was ca. 2.5 mm. A 3D-printer equipped with a 0.5 mm diameter nozzle was used to print the created filaments.

The printing process was controlled by software provided with the 3D printer. 3D objects were printed to test the printability and welding characteristics of the materials. The printing design and tear test were conducted according to the National Institute of Standards and Technology (NIST). In this study, a set of specific printing protocols including printing temperature (230° C.), bed temperature (110° C.), and printing speed (50 mm/s) was used.

Characterization and Analysis

A high loading (40 wt. %) lignin-ABS composite has a similar tensile Young's modulus (1.82±0.08 GPa) to that of pristine ABS (1.91±0.32 GPa). However, the addition of lignin generally results in a very brittle structure. For example, the ultimate tensile strain of 40 wt. % lignin in ABS (ABS-Lignin-64) is very small, approximately 1.2%. The rigid phenolic and aromatic structures of lignin provide reinforcement effects (stiffness enhancement) within the composites. However, lignin being a very low molecular weight (3000 Da) rigid additive causes excessive brittleness in the ABS matrix.

Incorporation of acrylonitrile butadiene rubber in lignin counteracts the brittleness issue and results in composites that exhibit excellent plasticity. Also, the presence of acrylonitrile butadiene polymeric chains in ABS suggests a good compatibility of NBR41 with the ABS-Lignin-64 composite. Therefore, using NBR41 was found to be useful for enhancing the flexibility of ABS-Lignin-64. The ABS used in this study has a low strain at break, ca. 8.3±1.7%. However, by adding NBR41 into ABS, the ultimate strain was significantly improved. For example, with only 10 wt. % NBR41, the average strain at break of ABS-NBR41-91 is approximately 45%. Consequently, the tensile energy to break (the integrated area under the stress/strain curve) is enhanced drastically, from ca. $39 \times 10^5$ to $186 \times 10^5$ (J/m$^3$). Remarkably, by adding 30 wt. % NBR41, the ABS-NBR41-73 composite indicates an extremely large strain at break (approximately 152%) and a high tensile energy to break (ca. $364 \times 10^5$ J/m$^3$). However, increasing NBR41 content results in a considerable drop of tensile strength and tensile Young's modulus. The ABS-NBR41-91 composite exhibits a similar Young's modulus to that of the pristine ABS (~1.91 GPa) and a high tensile strength (~42 MPa). Therefore, in this study, 10 wt. % NBR41 was selected and employed in all studied compositions.

Figures 1A, 1B:
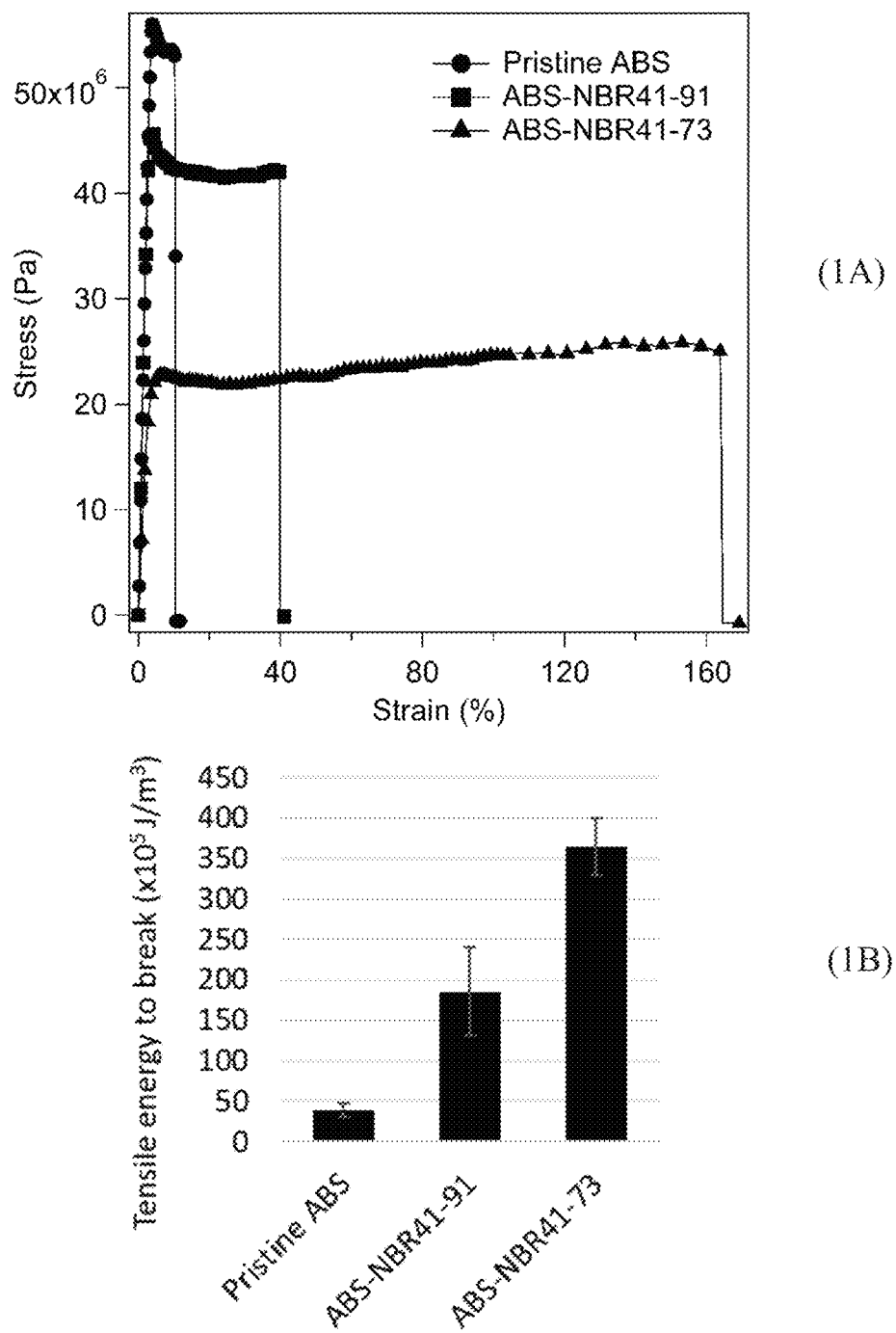
FIGS. 1A-1F are graphs showing tensile test data of selected composites. All samples were compression molded for the mechanical tests.
Figure 1C:
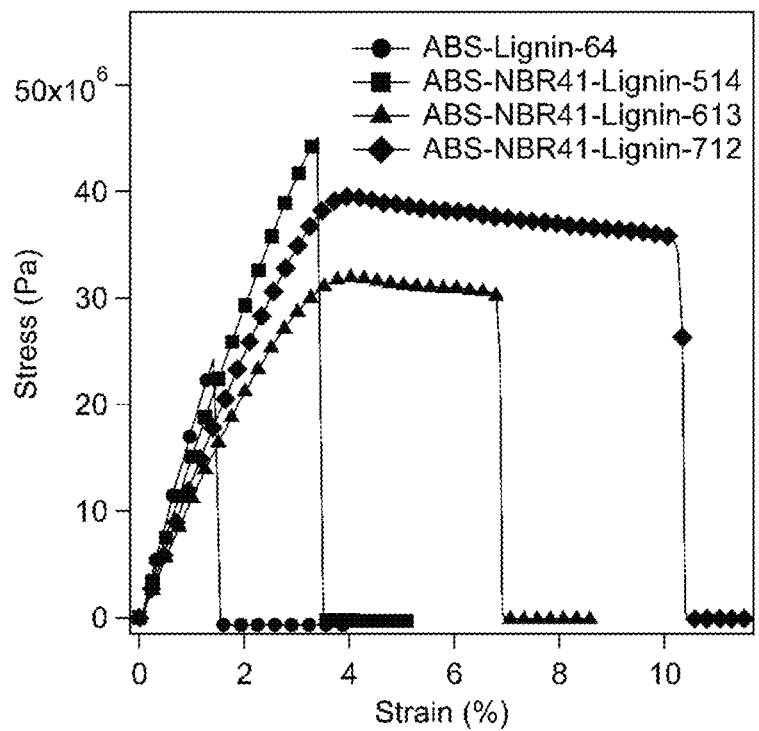
Figure 1D:
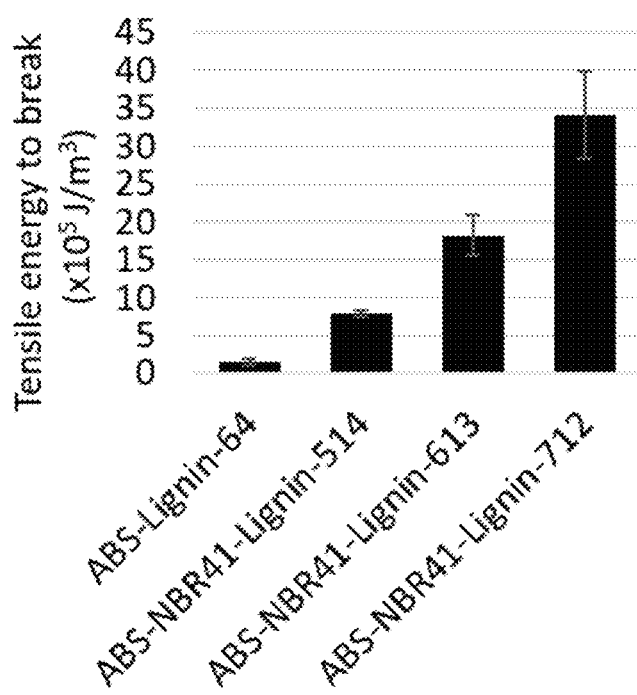

Selected lignin contents of 20 wt. %, 30 wt. %, and 40 wt. % were melt-mixed with ABS in the presence of a fixed NBR41 content (10 wt. %). FIG. 1A shows stress-strain curves of acrylonitrile butadiene styrene (ABS) and blends of ABS with 10 wt. % acrylonitrile butadiene rubber-41 mol % nitrile content, NBR41 (ABSNBR41-91) and ABS with 30 wt. % NBR41 (ABS-NBR41-73), and FIG. 1B shows their corresponding tensile energy to break (the area under the stress-strain curves). FIGS. 1C and 1D show representative stress/strain curves and tensile energy to break, respectively, of these corresponding composites. As indicated in FIG. 1D, the 40 wt. % lignin-based composite (ABS-NBR41-Lignin-514) exhibits an increase in tensile energy to break from ca. $1.43 \times 10^5$ (J/m$^3$) to ca. $7.92 \times 10^5$ (J/m$^3$), a more than five-times increase. The significant improvement of ultimate tensile strain and tensile strength at break of the investigated composites having different lignin ratios results in considerable enhancement of tensile energy to break. Notably, the addition of only 10 wt. % NBR41 contributed noticeably to the increase in tensile strength at break of ABS-Lignin composites. For example, ABS-Lignin-64 has a very low tensile strength, approximately 20.5±3.34 MPa, which is much lower than that of the ABS-NBR41-Lignin-514 sample (ca. 39.79±3.54 MPa). Thus, the composition exhibits an approximately 94% increase in strength by the addition of 10 wt. % NBR41. The formation of chemical and physical crosslinks within NBR41 and lignin is the most likely reason for improving the mechanical properties of these composites. Hydrogen bonds between the hydroxyl groups of lignin and nitrile groups of NBR41 and ABS were confirmed by a strong FTIR absorbance peak at ca. 3200-3500 cm$^{-1}$. Mechanical melt mixing at high temperature generates free radicals from unstable lignin linkages, such as β-0-4'. These active free radicals can self-react and couple or stimulate the chemical crosslinking with NBR41 through the unsaturated double bonds of butadiene.

Figure 1E:
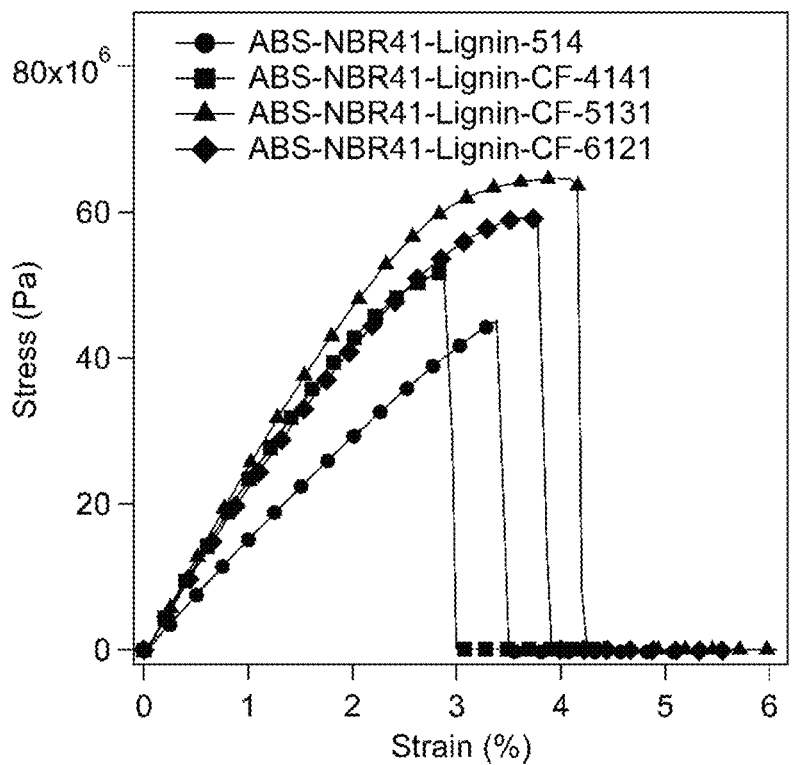
Figure 1F:
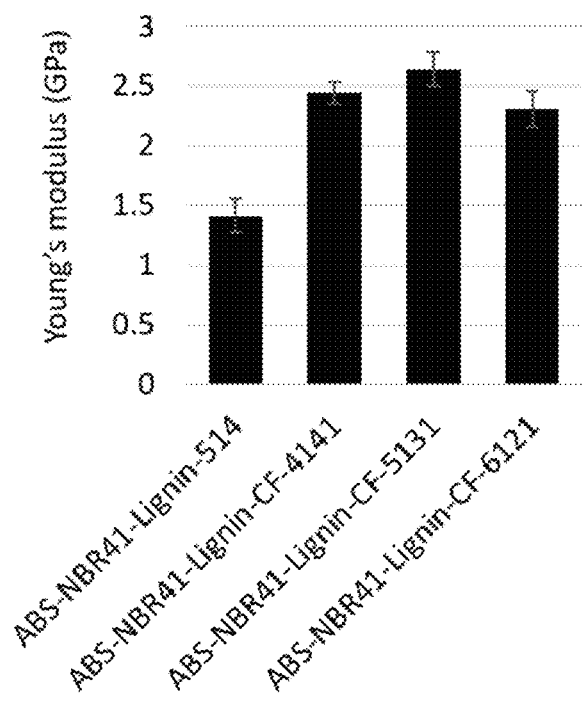

The addition of reinforcing fibers to a polymer matrix may also increase its mechanical performance and melt-viscosity. Since an aim of this work is to attain reinforced 3D-printable compositions, a minimal loading of CFs can be desirable. Interestingly, the addition of only 10 wt. % CFs resulted in considerable mechanical property enhancement. By providing sufficient mechanical improvements at such a low concentration, this study selected 10 wt. % CF as a constant. In this study, the weight fractions of CFs (10 wt. %) and NBR41 (10 wt. %) were chosen to prepare the ABS-lignin composites, in which the lignin contents were 20 wt. %, 30 wt. % and 40 wt. %. CFs contributed significantly to the improvement of both tensile strength and Young's modulus. For example, ABS-NBR41-Lignin-CF-5131 has a tensile strength and tensile Young's modulus of ca. 64.68±2.54 MPa (approximately 108% increase in comparison to the ABS-NBR41-Lignin-613 composite) and 2.64±0.14 GPa approximately 122% increase), respectively, as shown in FIGS. 1E and 1F. CF-reinforced polymer-based composites have been studied extensively. Herein, a focus is on developing a thermoplastic matrix based on the utilization of lignin reinforced with CFs as a feedstock for additive manufacturing with tunable 3D-printing characteristics. ABS-NBR41-Lignin-514 and ABS-NBR41-Lignin-CF-4141 are two samples containing a high loading lignin fraction of (40 wt. %) that were selected to prepare 3D-printing filaments and compared to neat ABS. The effects of lignin and CFs on thermal and rheological properties corresponding to the 3D-printing characteristics of these composites are discussed in the following sections. Specifically, the weld energy or the work of adhesion between the 3D-printed layers and their corresponding mechanical properties were determined.

Effects of Morphology on Thermal and Rheological Properties

Thermal transition and flow behaviors of the synthesized renewable composites are critical factors directly affecting their 3D-printability. These material properties strongly depend on the structure formation within the composites. FIGS. 2A and 2B are graphs showing the thermal characteristics of neat ABS, lignin, NBR41, ABS-NBR41-Lignin-514 and ABS-NBR41-Lignin-CF-4141. The step change of heat flow and heat capacity from increasing the temperature indicates a glass transition temperature ($T_g$). In this study, three independent runs of each sample were characterized. NBR41 has a very low $T_g$, ca. −12.8±3.1° C., whereas neat ABS and lignin indicate a higher $T_g$ of approximately 104.1±0.2° C. and ca. 86.2±1.2° C., respectively (see Table 1 below). For the ideal mixing of homogeneous polymers, the $T_g$ of the blend follows the Couchman rule (Couchman, P., *Macromolecules* 1978, 11 (6), 1156-1161).

TABLE 1

The measured glass transition temperature ($T_g$) and the corresponding heat capacity change ($\Delta C_p$) of pristine ABS, NBR41, and lignin.

| | ABS | NBR41 | Lignin |
|---|---|---|---|
| $T_g$ (° C.) | 104.1 ± 0.2 | −12.8 ± 3.1 | 86.2 ± 1.2 |
| $\Delta C_p$ (J/g · ° C.) | 0.281 ± 0.009 | 0.548 ± 0.016 | 0.490 ± 0.031 |

The measured DSC data (Table 1) show the glass transition temperatures and heat capacity changes of the investigated pristine polymers (ABS, NBR41, and lignin). Note that the heat capacity change of CFs is 0. The corresponding glass transition temperatures of different composites were computed. The data in FIG. 2B are the glass transition temperatures of two selected samples (ABS-NBR41-Lignin-514 and ABS-NBR41-Lignin-CF-4141) measured by DSC in comparison to the data computed by using the Couchman rule. In all cases, the composite samples revealed a higher $T_g$. For example, an increase in $T_g$ of ca. 14° C. (18.5% increase) and 16° C. (21.3% increase) was measured in ABS-NBR41-Lignin-514 and ABS-NBR41-Lignin-CF-4141 samples, respectively. The increasing trend in $T_g$ was observed in different compositions as well. It is possible that the molecular level mixing of these components may not be ideal or homogenous.

To verify the formation of phase-separated domains within the composites, the morphologies of these samples were investigated by using high resolution scanning electron microscopy (SEM). FIG. 3, which contains panels (a-1), (a-2), (a-3), (b-1), (b-2), (b-3), (c-1), (c-2), and (c-3), shows the examined SEM images of representative fractured samples after tensile testing, including ABS, ABS-NBR41-Lignin-514 and ABS-NBR41-Lignin-CF-4141. In FIG. 3, panels (a-1), (a-2), and (a-3) show SEM images of ABS at progressively increasing magnification; panels (b-1), (b-2), and (b-3) show SEM images of ABS-NBR41-Lignin-514 at progressively increasing magnification; and panels (c-1), (c-2), and (c-3) show SEM images of ABS-NBR41-Lignin-CF-4141 at progressively increasing magnification. As shown in FIG. 3, ABS has a homogeneous morphology, in which the phase-separated structure is not clearly observed ("a" panels). As also shown in FIG. 3, the addition of NBR41 and lignin reveal the presence of well-dispersed micro phase (ca. 3 μm) lignin particles ("b" and "c" panels). The well-dispersed lignin particles are also observed in different compositions (particularly in the ABS-Lignin-64 sample). It appears that the presence of NBR41 and CFs break down the lignin phase separated particles, thus resulting in smaller particles (ca. 1.5 μm), as shown in FIG. 3. Notably, the pristine lignin has a very broad glass transition temperature window (ca. 60° C.-100° C.). ABS exhibits a sharp thermal transition with a narrow temperature window (ca. 100° C.-110° C.), as shown in FIG. 2A, which is within the thermal transition temperature region of lignin. Therefore, the measured DSC $T_g$ data (FIG. 2B) are from the average of two overlapped molecular phase transitions containing lignin particles and ABS in the mixed phase with NBR41. As a result, both ABS-NBR41-Lignin-514 and ABS-NBR41-Lignin-4141 exhibit very broad heat flow changes (FIG. 2A). Notably, the ABS-Lignin-64 followed the Couchman rule very well. The measured DSC Tg (95.8±0.6° C.) and the computed Couchman data (94.4° C.) are not very different. The presence of lignin separated particles within ABS-Lignin-64 (ca. 4 µm) is clearly observed in the SEM images. In this case, the overlap of thermal transition temperature windows of pristine ABS and lignin validates the Couchman rule. However, the local transition of phase-separated lignin particles is not distinguishable. Recently, it was revealed that chemical crosslinking within NBR41 and lignin resulted in the failure of the Fox equation (a simple form of Couchman rule) (N. A. Nguyen et al., *Macromolecules* 2018, 51(1), 115-127). Apparently, the formation of chemical crosslinks within the composites varies the Couchman rule as well. Similar behavior was observed in the other composite.

Next, the rheological properties of ABS, ABS-NBR41-Lignin-514, and ABS-NBR41-Lignin-CF-4141 were investigated to understand the effects of well-dispersed lignin phase separated particles, hydrogen bonds, and chemical crosslinks within the composites. FIG. 4A shows the storage modulus (G') as a function of oscillation strain. The data in FIG. 4A presents the storage modulus (G') as a function of oscillatory strain at a reference temperature $T_{ref}$=230° C. ABS exhibited a very good elastic response (Newtonian plateau) having a large strain amplitude of the linear viscoelastic region, ca. 15%, which is noticed by a drop of G'. Both ABS-NBR41-Lignin-514 and ABS-NBR41-CF-4141 exhibit a low strain amplitude to maintain the elastic characteristic, approximately 10% and 5%, respectively. It appears that the oligomeric nature of lignin and the heterogeneous structures of the two lignin-based composites induces different local relaxation and dynamic response states of individual aggregated phases. Also, the low flexibility within the lignin structure and the presence of rigid CFs likely contribute significantly to the strain dependent plateau G'. FIG. 4B shows G' versus angular frequency at a reference temperature of $T_{ref}$=230° C. for ABS, ABS-NBR41-Lignin-514, and ABS-NBR41-Lignin-CF-4141 samples. The data in FIG. 4B are the master curves at $T_{ref}$=230° C. of the three samples. The frequency sweeps in the linear viscoelastic regions (very small strain amplitude, 3-5%) at four different temperatures, including 170° C., 190° C., 210° C., and 230° C., were measured. The master curves were constructed using the Williams-Landel-Ferry (WLF) relationship (M. L. Williams et al., JAGS, 77(14), 3701-3707, 1955):

$$\eta = a_T \eta_{ref} \quad (1)$$

$$\log(a_T) = \frac{C_1(T - T_{ref})}{C_2 + (T - T_{ref})} \quad (2)$$

where $\eta$ and $\eta_{ref}$ is the viscosity at a temperature (T) and a reference temperature ($T_{ref}$), respectively; $C_1$ and $C_2$ are the material constants.

As shown in FIG. 4B, ABS-NBR41-Lignin-514 exhibits a low G' over a wide range of angular frequency (ca. $10^0$-$10^4$ rad/s). However, by adding 10 wt. % CFs (see ABS-NBR41-Lignin-CF-4141), G' increases slightly higher than that of neat ABS within ca. $10^2$-$10^4$ rad/s. This behavior can be attributed to the percolation of CFs in which they behave like rigid physical networks and induce reinforcement (e.g., A. Durmus, et al., Polymer, 48(15), 4492-4502, 2007). No further relaxation of ABS in the terminal region (very low frequency, approximately $10^{-1}$-$10^0$ rad/s) is observed (FIG. 4B). For a viscoelastic flow, the slope of G' and G" (loss modulus) as a function of angular frequency in the terminal region approaches 2 (dG'/dω=2.0) and 1 (dG"/dω=1.0), respectively. In this condition, the polymeric chains are expected to be totally relaxed. Strong intermolecular interactions, and branched and crosslinked structures, are possible reasons to vary this terminal response. Viscous flow is not observed in all three samples (FIG. 4B). In all cases, the phase angle δ is always smaller than 45°. Note that tan (δ) is the ratio of G" over G'. Therefore, G' is always larger than G" in the whole range of investigated frequencies ($10^{-1}$-$10^4$ rad/s), which indicates the domination of solid-like responses. Notably, there is an increase in G' of ABS-NBR41-Lignin-514 sample (higher than G' of neat ABS) at low frequency (ca. $10^{-1}$-$10^0$ rad/s), denoted by the dashed circle, which is in contrast with the trend in G' values at high angular frequencies (FIG. 4B). Similarly, significantly high terminal G' is measured in ABS-NBR41-Lignin-CF-4141 composite. The chemical and physical crosslinks formed within NBR41 and lignin likely result in the increase in G' at low frequency region. Additionally, the percolation of high aspect ratio fillers, such as carbon fibers, may result in a high modulus in the terminal regions. It is possible that the percolated CFs cause more solid-like characteristics of the ABS-NBR41-Lignin-CF-4141. The high G' of ABS-NBR41-Lignin-CF-4141 in the terminal region is from the unrelaxed state caused by the solid CF physical network (percolation) in the polymer melt.

The effects of phase separation and intermolecular interactions on dynamic rheological properties of the composites can be verified by using the van Gurp-Palmen plot (M. Van Gurp et al., *Rheol. Bull.*, 67(1), 5-8, 1998) in which the phase angle, $\delta = \tan^{-1}(G''/G')$, is plotted as a function of absolute complex modulus (G*). FIGS. 4D-4F show the van Gurp-Palmen plots of ABS, ABS-NBR41-Lignin-514, and ABS-NBR41-Lignin-CF-4141 samples measured by dynamic frequency sweeps at four selected temperatures. All measured data are plotted without vertical shifts. Notably, all the curves of ABS samples fall into one master curve. Both ABS-NBR41-Lignin-514 and ABS-NBR41-Lignin-CF-4141 samples indicate some deviation at low G*, which is very sensitive to δ, G*=G'/cos(δ) (R. Tao et al., *The Journal of Physical Chemistry B*, 119(35), 11953-11959, 2015). The presence of well-dispersed phase-separated lignin particles and percolated CFs caused these variations. The immiscibility or presence of aggregated phases and long branched or crosslinked chains contribute greatly to the deviation of δ and can lead to longer relaxation time (Van Gurp et al., supra). Additionally, each component has different temperature sensitivity and dynamic characteristics, thus resulting in different relaxation states. FIG. 4E reveals a distinct drop of (δ) within the low G* region at 230° C. for ABSNBR41-Lignin-514, which indicates more solid-like behavior and low damping factor of the composite. ABS-NBR41-Lignin-514 exhibits less relaxation of polymer chains, which may be attributed to the covalent crosslinks within lignin and NBR41. However, ABS-NBR41-Lignin-CF-4141 indicates a slight increase in δ at 230° C., which indicates an increase in the relaxation state of the material at high temperature (FIG. 4F). This (δ) change is dominated by the relaxation of physical crosslinks created by percolated CFs, which are weaker than the covalent crosslinks formed within lignin and NBR41. This conjecture is in agreement with the discussion in the previous section. It is possible that the presence of CFs within the composite retards the formation of chemical crosslinks within lignin and NBR41 during the melt mixing process. The breaking of physical crosslinks (CF percolation) within the component by further deformation causes a short linear viscoelastic region for ABS-NBR41-Lignin-CF-4141 (FIG. 4A).

TABLE 2

The measured DSC on-set ($T_O$) and end-set ($T_E$) glass transition temperatures of two investigated composites.

|  | ABS-NBR41-Lignin-514 | ABS-NBR41-Lignin-CF-4141 |
| --- | --- | --- |
| $T_O$ (° C.) | 76.5 ± 0.3 | 71.6 ± 0.2 |
| $T_E$ (° C.) | 103.9 ± 0.5 | 101.4 ± 0.9 |
| $\Delta T$ (° C.) | 27.4 ± 0.8 | 29.7 ± 0.9 |

Note:
$\Delta T = T_E - T_O$.

Notably, as shown in the FTIR data in FIG. 4C, ABS-NBR41-Lignin-CF-4141 exhibits stronger hydrogen bonding than ABSNBR41-Lignin-514. Less hydrogen bonding formed within the NBR41-Lignin-514 is likely due to the constraining of polymeric chains caused by the chemical crosslinks within NBR and lignin. A similar trend is also seen in different composites containing CFs. Additionally, the higher crosslinked structure of ABS-NBR41-Lignin-514 is consistent with the measured DSC data shown in FIG. 2A and Table 2. Both on-set (To) and end-set ($T_E$) glass transition temperatures of ABS-NBR41-Lignin-514 are higher than the data obtained from the composite containing CFs. The crosslinking reduces the molecular mobility, thus increasing the thermal transition temperature. Furthermore, the higher crosslinked structure of ABS-NBR41-Lignin-514 in comparison to ABSNBR41-Lignin-CF-4141 is also confirmed by observation of higher thermal stability characteristics. The derivative of weight loss as a function of temperature, d (weight loss, %)/d (T, ° C.), shows that pristine lignin has a distinct degradation shoulder in comparison to the other samples. Lignin exhibits the lowest thermal stability, but the composites of lignin with NBR41 and ABS exhibit significantly improved thermal stability resulting from crosslink formation. For example, the 5% weight loss ($T_5$) and the first maximum weight loss ($T_{m1}$) of ABS-NBR41-Lignin-514 is higher than that of the corresponding sample containing 10 wt. % CF, ABS-NBR41-Lignin-CF-4141.

3D-Printability and Weld Energy

FIG. 5A plots shear rate dependent viscosity of the studied samples at $T_{ref}$=230° C. (constructed from the master curves and Cox-Merz rule). The dashed circle in FIG. 5A indicates a printing window. It is evident that all studied compositions (i.e., ABS, ABS-NBR41-Lignin-514, and ABS-NBR41-Lignin-CF-4141) exhibit melt viscosity of 1000-200 Pa·s in the 100-1000 s$^{-1}$ shear rate window. FIG. 5B plots the Arrhenius fitting of the shift factor (aT) as a function of the inverse temperature (1/T) obtained from the master curve construction. FIG. 5C plots G' as a function of oscillation stress at $T_{ref}$=230° C. FIG. 5D shows examples of 3D-printed objects made from ABS ("0" and "R"), ABS-NBR41-Lignin-514 ("N"), and ABS-NBR41-Lignin-CF-4141 ("L" and the oak leaf).

To investigate the 3D-printability of these samples, ca. 2.5 mm diameter filaments were prepared and tested on a 3D printer. The filaments were capable of being rolled, loaded and printed using a commercial 3D printer. For example, the ABS filament was used to 3D print the letters "0" and "R" (FIG. 5D). ABS-NBR41-Lignin-514 and ABS-NBR41-Lignin-CF-4141 filaments were used to print the letters "N" and "L", respectively (FIG. 5D). Also, the filament containing 10 wt. % CFs was used to print an oak leaf, as shown in FIG. 5D. Overall, these lignin-based composites exhibited excellent printing characteristics.

Interestingly, the end-set temperatures for the $T_g$ of both ABS-NBR41-Lignin-514 ($T^b_E$=131.9° C.) and ABS-NBR41-Lignin-CF-4141 ($T^b_E$=125.2° C.) are higher than that of neat ABS ($T^b_E$=112.9° C.) as indicated by the tan (δ) spectra. This increase is likely due to the low molecular mobility within the glassy transformation region of these two samples. Additional intermolecular interactions induce the higher temperature shifts. These interactions were formed by multiple hydrogen bonds between lignin-lignin, lignin-ABS, and lignin-NBR41 through abundant hydroxyl groups (—OH) of lignin and nitrile (—C≡N) functional groups of NBR41 and ABS as shown in FIG. 4C. Lignin self-crosslinks and crosslinks with NBR to form the chemical network within the structure. The formation of a crosslinked structure within NBR41 and lignin contributes to the decrease of molecular mobility as well. Notably, the ABS-NBR41-Lignin-CF-4141 composite exhibits a narrower tan (δ) with a higher magnitude lower end-set temperature ($T^b_E$=125.2° C.) and a lower G' within the glassy to rubbery transition in comparison to the ABS-NBR41-Lignin-514 composite ($T^b_E$=131.9° C.), which suggests lower chemical cross-links in the presence of CFs. The measured thermal and rheological data discussed earlier corroborates the analyzed dynamic mechanical data within the glassy transition.

Here, the effects of morphological characteristics on the weld energy of 3D-printed layers were revealed. The weld energy is not very sensitive to the printing rate but rather the printing temperature (J. Seppala et al., Soft Matter, 13(38), 6761-6769, 2017). Modified printing temperatures lead to significant changes in the weld time between the two consecutive layers. This weld time depends on the cooling process of the printed layer after deposition. The welding stops after the temperature reaches the $T_g$ of the printing material (J. Seppala et al., Soft Matter, 13(38), 6761-6769, 2017). The weld energy also depends on the interfusion and melt-diffusion between two printed layers that is strongly affected by the flow behavior of the materials. The impacts of chemical/physical crosslinks and hydrogen bonds on the welding characteristics of these printed layers were identified. A low melt viscosity facilitates the diffusion process. In this study, the weld energy of the ABS-NBR41-Lignin-CF-4141 composite is approximately double the weld energy of ABS-NBR41-Lignin-514 despite ABS-NBR41-Lignin-CF-4141 exhibiting a slightly higher melt viscosity and flow activation energy (Table 3, below) than that of the ABS-NBR41-Lignin-514 within the printing window at $T_{ref}$=230° C. (FIGS. 5A and 5B). To unveil this ambiguity, morphological analysis of these tear-tested 3D-printed samples was performed. The tear-fractured surface (plane P1), cross-section (plane P2) and side-view (plane P3) were analyzed by SEM. Interestingly, there were no significant differences between the tear-fractured surfaces of ABS and ABS-NBR41-Lignin-514 samples, in which smooth and uniform fractured surfaces were observed. In contrast, the tear-fractured surface of ABS-NBR41-Lignin-CF-4141 was observed to be irregular with the presence of CFs oriented toward the weld surface (P1 plane), the viewing plane. Notably, CF traces are visible as voids due to the removal of CFs by the applied tear-force.

TABLE 3

The activation energy computed from the Arrhenius fitting of the studied samples (Data obtained from the slope of the plots shown in FIG. 5B).

|  | ABS | ABS-NBR41-Lignin-514 | ABS-NBR41-Lignin-CF-4141 |
|---|---|---|---|
| $E_a$ (KJ/mol) | 139.5 | 125.9 | 147.6 |

In conclusion, the above experimental work combined lignin, a waste byproduct from the pulping industry and biorefineries, with ABS to reduce the rigid styrene fraction within the thermoplastic matrix, to prepare high performance renewable composites compatible with 3D-printing. The addition of lignin resulted in a more brittle structure and low toughness. For example, ABS-Lignin-64 (40 wt. % lignin content) had a very low tensile energy at break (ca. 1.4×105 J/m3) and low tensile strength (ca. 20.5 MPa). However, like for ABS composites, the presence of NBR41 contributed considerably to the increase in material performance. For example, the ABS-NBR41-Lignin-514 composite indicated approximately a 94% tensile strength increase by adding only 10 wt. % NBR41. The formation of crosslinks and multiple hydrogen bonding structures within the composites enhanced the mechanical characteristics. In this study, use of CFs (only by 10 wt. %) both reinforced the renewable composites and improved their 3D-printing characteristics. The lignin-based composites exhibited equivalent or even better mechanical performance in comparison to regular petroleum-based thermoplastics. For example, the ABS-NBR41-Lignin-CF-5131 had a tensile strength of ~65 MPa and a tensile Young's modulus of ~2.6 GPa. The percolation of CFs contributed significantly to the improvement of the composites' mechanical properties. The combination of ABS, NBR41, and lignin revealed a promising route to utilize high loading of lignin as a sustainable feedstock for additive manufacturing.

The high loading of lignin in the composites (40 wt. % lignin), namely ABS-NBR41-Lignin-514 and ABS-NBR41-Lignin-CF-4141, demonstrated excellent 3D-printability. The presence of well-dispersed phase-separated lignin particles within the composites induced different local relaxation of the materials indicating different thermal sensitivity and rheological responses that facilitated the 3D-printing process. Local low melt viscosity of the aggregated lignin phase lubricated the flow-resistant ABS matrix and physical network formed by percolated CFs in the composite. The formation of chemical crosslinks within ABS-NBR41-Lignin-514 caused a decrease in molecular mobility and chain flexibility. However, the presence of CFs inhibited the crosslinking within NBR41 and lignin and broke down the lignin particles during melt mixing. The ABS-NBR41-Lignin-CF-4141 composite exhibited preferable local relaxation of separated lignin particles during 3D printing. Consequently, better melt-diffusion and interfusion between the printed layers were achieved, which resulted in high weld energy or inter-layer work of adhesion. For example, ABSNBR41-Lignin-CF-4141 had a weld energy of ca. 4000 N/m, which is almost two-fold higher than that of the neat ABS and ABS-NBR41-Lignin-514. Misalignment of CFs along the printing flow direction created CF bridges between the printed layers and reinforced the weld zone. The morphology combined with thermal and rheological properties of these renewable composites elucidated the mechanism of the enhanced 3D-printability and material performance. This study converts lignin from a waste stream to a valuable feedstock for additive manufacturing. This alternative for petroleum-based 3D-printing materials provides cheap and renewable materials having similar or even better performance and opens a new route to reduce present environmental concerns while delivering products with superior mechanical performance.

While there have been shown and described what are at present considered the preferred embodiments of the invention, those skilled in the art may make various changes and modifications which remain within the scope of the invention defined by the appended claims.

What is claimed is:

1. A solid polymer blend material comprising:
   (i) a lignin-acrylonitrile component containing a homogeneous blend of a lignin component and an acrylonitrile-containing rubber component; and
   (ii) a high impact polystyrene component that is non-elastomeric;
   wherein components (i) and (ii) are homogeneously dispersed in the solid polymer blend material.

2. The polymer blend material of claim 1, wherein the lignin is present in an amount of 10-60 wt % by weight of the polymer blend material.

3. The polymer blend material of claim 1, wherein the lignin is present in an amount of 20-40 wt % by weight of the polymer blend material.

4. The polymer blend material of claim 1, wherein said high impact polystyrene component is present in an amount of 10-60 wt % by weight of the polymer blend material.

5. The polymer blend material of claim 1, wherein said acrylonitrile-containing rubber component is nitrile butadiene rubber.

6. A method of producing an object made of a lignin-containing polymer blend material by melt extrusion, the method comprising:
   (a) melt blending the following components: (i) a lignin-acrylonitrile component containing a homogeneous blend of a lignin component and an acrylonitrile-containing rubber component;
   and (ii) a high impact polystyrene component that is non-elastomeric, to form a melt of a polymer blend in which components (i) and (ii) are homogeneously blended, wherein the polymer blend exhibits a melt viscosity of no more than 2000 Pa·s at a shear rate of 100-1000 s$^{-1}$ and when heated to a temperature of no more than 240° C.; and
   (b) forming an object made of said polymer blend material in solid form, wherein the polymer blend in solid form comprises: (i) lignin-acrylonitrile component; and (ii) said high impact polystyrene component that is non-elastomeric; wherein components (i) and (ii) are homogeneously dispersed in the solid polymer blend material.

7. The method of claim 6, wherein step (b) employs an extrusion process to form said object.

8. The method of claim 7, wherein said extrusion process occurs in a heating chamber containing a nozzle, and pressure is induced on the melt of the polymer blend material while the polymer blend material is in said heating chamber to adjust the flow rate of the melt through the nozzle to result in the melt having a melt viscosity of no more than 2000 Pa·s.

9. The method of claim 8, wherein said heating chamber is connected to a piston that induces pressure on the melt of the solid polymer blend material as the piston pushes the melt through the nozzle.

10. The method of claim 8, wherein pressure is induced on the melt of the polymer blend material by exerting pressure on a solid filament of the polymer blend material as the solid filament is being fed into said heating chamber, wherein the pressure pushes the solid filament into the heating chamber at a desired flow rate.

11. The method of claim 7, wherein said extrusion process occurs in an additive manufacturing process.

12. The method of claim 6, wherein step (b) employs a casting process in which the melt is casted in a mold.

13. The method of claim 12, wherein said casting process is an injection molding process.

14. The method of claim 13, wherein said injection molding process is a resin transfer molding process.

15. The method of claim 12, wherein said casting process is a compression molding process.

16. The method of claim 6, wherein the lignin is present in an amount of 10-60 wt % by weight of the solid polymer blend material.

17. The method of claim 6, wherein the lignin is present in an amount of 20-40 wt % by weight of the solid polymer blend material.

18. The method of claim 6, wherein said high impact polystyrene component is present in an amount of 10-60 wt % by weight of the polymer blend material.

19. The method of claim 6, wherein said acrylonitrile-containing rubber component is nitrile butadiene rubber.

20. The method of claim 1, wherein said acrylonitrile-containing rubber component is present in an amount of 10-30 wt % of the polymer blend material.

\* \* \* \* \*